United States Patent
Chow et al.

(10) Patent No.: US 9,172,686 B2
(45) Date of Patent: Oct. 27, 2015

(54) FACILITATING HETEROGENEOUS AUTHENTICATION FOR ALLOWING NETWORK ACCESS

(75) Inventors: Anthony Chow, San Gabriel, CA (US); Minka Nikolova, West Hills, CA (US); L. Michele Goodwin, Westlake Village, CA (US); Vincent Vermeulen, Newbury Park, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 1440 days.

(21) Appl. No.: 11/887,721

(22) Filed: Sep. 28, 2007

(65) Prior Publication Data

US 2011/0004918 A1    Jan. 6, 2011

(51) Int. Cl.
*H04L 29/06* (2006.01)

(52) U.S. Cl.
CPC ............... *H04L 63/08* (2013.01); *H04L 63/20* (2013.01)

(58) Field of Classification Search
USPC ............................................................ 726/6
See application file for complete search history.

(56) References Cited

U.S. PATENT DOCUMENTS

2006/0026671 A1    2/2006    Potter et al.

FOREIGN PATENT DOCUMENTS

| GB | 2 435 161 A | 8/2007 |
| GB | 2435161 A | 8/2007 |

*Primary Examiner* — Jacob Lipman
(74) *Attorney, Agent, or Firm* — Loza & Loza, LLP

(57) ABSTRACT

A method comprises an operation for facilitating authentication of a client device attempting to connect to a port of a network element. Facilitating authentication includes determining whether the client device is configured for being authenticated using a first authentication mechanism and, in response to determining that the client device is not configured for being authenticated using the first authentication mechanism, determining whether the client device is configured for being authenticated using at least one other authentication mechanism. For each one of the authentication mechanisms, an operation is provided for providing the client device with network connectivity dependent upon a respective first classification policy structure in response to the client device being successfully authenticated and an operation is provided for providing the client device with network connectivity dependent upon a respective second classification policy structure different that the first classification policy structure in response to the client device failing to be successfully authenticated.

27 Claims, 20 Drawing Sheets

FACILITATING HETEROGENEOUS AUTHENTICATION FOR ALLOWING NETWORK ACCESS

FIELD OF THE DISCLOSURE

The disclosures made herein relate generally to facilitating authentication of a client device (and/or associated client device user) seeking access to a network access port and, more particularly, to facilitating authentication of a client device (and/or associated client device user) in view of disparate authentication methods for potential client devices (and/or associated client device user).

BACKGROUND

In an enterprise data network, known authentication methodologies have required that the network administrator select and configure a particular authentication methodology (i.e. configured authentication methodology) that is to be used on a network access port of a particular switch or router. In some instances, the network access port might be configured with one default authentication methodology to classify a client device should the client device fail authentication under the configured authentication methodology. Examples of such known authentication methodologies include, but are not limited to, 802.1x authentication protocol, Media Access Control (MAC) authentication protocol, Web-based login and the like. This need to manually determine and configure the particular authentication methodology limits the device connected to a network access port to only use the configured authentication methodology because client devices connected to a network access port would be limited to only the configured authentication methodology and extensive manual administration would be necessary to support heterogeneous authentication methodologies whenever a client device compatible with one of many potential authentication methodologies moved in the network.

In accordance with 802.1x authentication protocol during a port start-up event on a network access port of a switch or router, an Extensible Authentication Protocol (EAP)-Request/Identity frame is sent to an 802.1x group MAC address in order to solicit start of authentication from supplicants connected to the port. After that, EAP-Request-Identity frames are sent only to the specific MAC addresses of the client devices sending data traffic on the port. This will trigger the start of the client device authentication if a client device is a supplicant (i.e., an 802.1X compliant device). If the client device is a supplicant, it should return an EAP-Response/Identity frame to start the authentication. If no EAP-Response/Identity frame is received, after a number of tries, the client device is considered to be a non-supplicant and, by default, is blocked. This scenario exemplifies the shortcoming associated with authentication of a client device that is attempting to connect to a network access port of a router or switch being limited to only a single authentication methodology. Similar shortcomings exist for authentication methodologies for non-supplicants.

Therefore, facilitating authentication of a client device in a manner that allows several different authentication methodologies to be automatically and sequentially applied in an effort to identify an authentication methodology that is compatible with authentication abilities of the client device would be advantageous, desirable and useful.

SUMMARY OF THE DISCLOSURE

Embodiments of the present invention provide for creating a series of policies that combine multiple authentication methods within one configuration, thereby allowing multiple client devices to connect to a network access port using different authentication methods. More specifically, embodiments of the present invention provide a methodology whereby a switch or router applies the appropriate authentication mechanism based on a pre-configured set of policies. An example of such a policy includes first attempting authentication using 802.1x authentication protocol, then if necessary attempting authentication using MAC authentication protocol, followed by attempting authentication using a web-based log-on (i.e., authentication) protocol, if necessary. Alternatively or optionally a combination of each authentication protocol can be attempted. Prior art solutions are not able to provide such an advanced and flexible methodology. Accordingly, this solution allows network access ports to be configured in a manner that allows mobile users (laptops, etc.) to move around a network infrastructure and use various authentication methods with having to reconfigure network access ports. In addition to the authentication functionality, facilitating authentication functionality using a series of policies in accordance with the present invention (i.e., compound policy chain) also provide for classification functionality that will determine what Virtual Local Area Network (VLAN) a particular client device will be placed into after being successfully authenticated. In this manner, facilitating client device authentication in accordance with the present invention provided for reduced operational overhead and/or an increased ability to identify and authenticate devices on the network, which are both building block for advanced network security features.

In one embodiment of the present invention, a method comprises a plurality of operations. An operation is provided for facilitating authentication of a client device attempting to connect to a port of a network element. Facilitating authentication includes determining whether the client device is configured for being authenticated using a first authentication mechanism (e.g., authentication protocol) and, in response to determining that the client device is not configured for being authenticated using the first authentication mechanism, determining whether the client device is configured for being authenticated using at least one other authentication mechanism. For each one of the authentication mechanisms, an operation is provided for providing the client device with network connectivity dependent upon a respective first classification policy structure in response to the client device being successfully authenticated and an operation is provided for providing the client device with network connectivity dependent upon a respective second classification policy structure different that the first classification policy structure in response to the client device failing to be successfully authenticated.

In another embodiment of the present invention, a set of processor-executable instructions is provided. The set of processor-executable instructions includes instructions for facilitating authentication of a client device attempting to connect to a port of a network element. Facilitating authentication includes determining whether the client device is configured for being authenticated using a first authentication mechanism and, in response to determining that the client device is not configured for being authenticated using the first authentication mechanism, determining whether the client device is configured for being authenticated using at least one other authentication mechanism. For each one of the authentication mechanisms, instructions are provided for providing the client device with network connectivity dependent upon a respective first classification policy structure in response to the client device being successfully authenticated and for providing the client device with network connectivity dependent upon a respective second classification policy structure different that the first classification policy structure in response to the client device failing to be successfully authenticated.

In another embodiment of the present invention, a server is configured for facilitating authentication of a client device attempting to connect to a port of a network element and, for each one of the authentication mechanisms, the server is further configured for providing the client device with network connectivity dependent upon a respective first classification policy structure in response to the client device being successfully authenticated and providing client device with network connectivity dependent upon a respective second classification policy structure different that the first classification policy structure in response to the client device failing to be successfully authenticated. Facilitating authentication includes determining whether the client device is configured for being authenticated using a first authentication mechanism and, in response to determining that the client device is not configured for being authenticated using the first authentication mechanism, determining whether the client device is configured for being authenticated using at least one other authentication mechanism.

These and other objects, embodiments, advantages and/or distinctions of the present invention will become readily apparent upon further review of the following specification, associated drawings and appended claims.

DETAILED DESCRIPTION OF THE DRAWING FIGURES

In accordance with embodiments of the present invention, each 802.1x port of a switch or router should have a number of different device classification policies that can be configured together with 802.1x authentication. Classification policy as referred to herein with respect to the present invention relates to a method for allowing network connectivity, which may end up (terminate) in a MAC address of a client device being learned on a VLAN or the client device being blocked from accessing the port. A policy need not terminate for all devices, in which case, some other policy may be applied next. Policies in accordance with embodiments of the present invention are configured in chains specifying both the policies and the order in which they will be applied. The first policy in the chain is applied first and, if it does not terminate, the second policy is applied and so on.

A policy chain may be seen as a compound policy consisting of a plurality of atomic policies. There are two such compound policies that are configured on an 802.1x-authenticated port: a supplicant policy and a non-supplicant policy. A supplicant policy applies to client devices that are 802.1x clients (commonly referred to as supplicants), while a non-supplicant policy applies to all other devices (i.e., non-supplicants).

Figure 1:
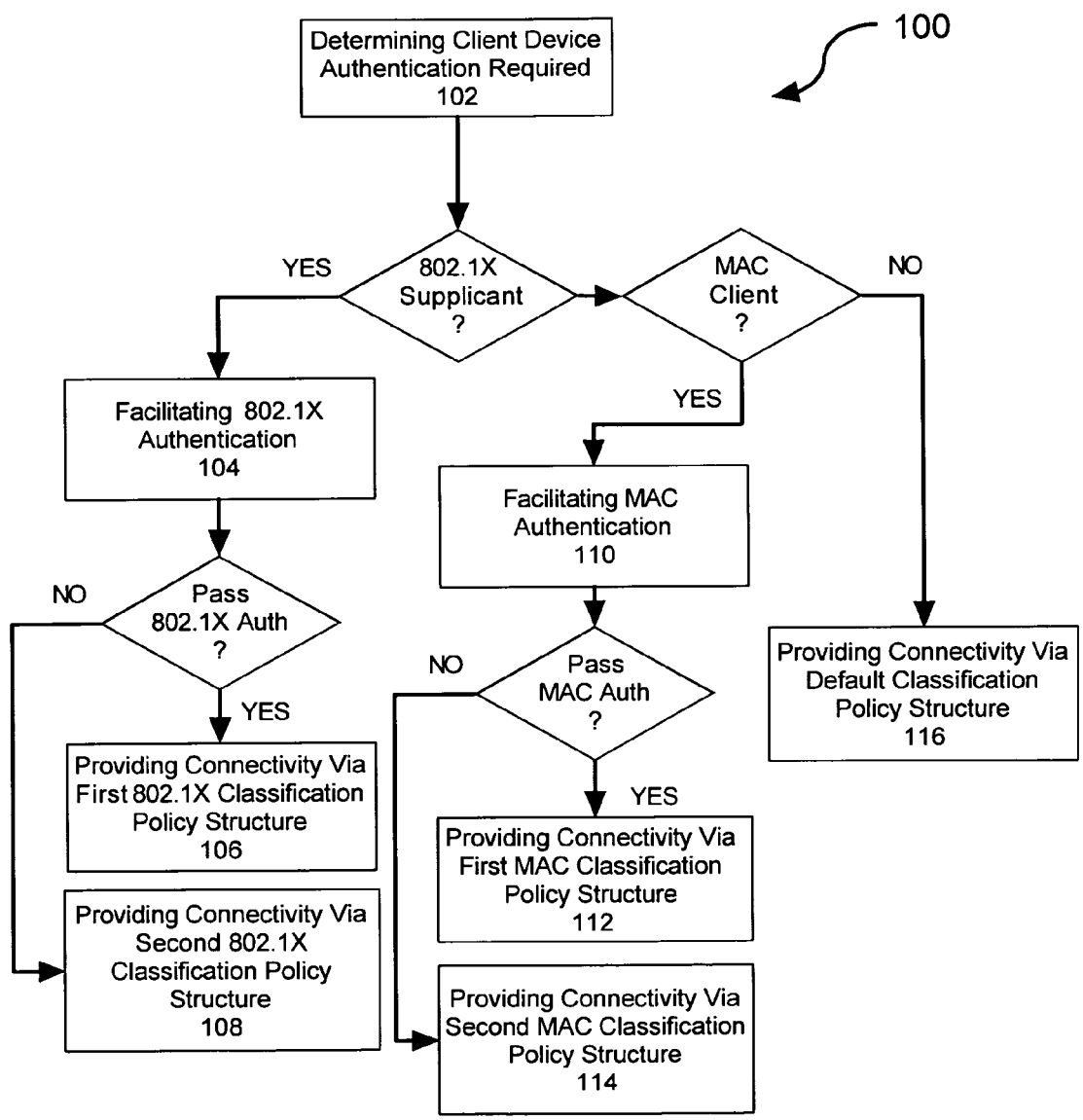
FIG. 1 is a flow chart showing a method 100 for facilitating port assignment of client devices in accordance with an embodiment of the present invention.

FIG. 1 shows a method 100 for facilitating port assignment of client devices in accordance with an embodiment of the present invention. The method 100 begins with an operation 102 for determining that client device authentication is required. In one embodiment, client device authentication includes or consists of user authentication. In response to such determining recognizing that the client device is an 802.1X supplicant, an operation 104 is performed for facilitating 802.1X authentication of the client device. In response to the client device successfully passing the 802.1X authentication, an operation 106 is performed for providing network connectivity via a first 802.1X classification policy structure. In response to the client device failing the 802.1X authentication, an operation 108 is performed for providing network connectivity via a second 802.1X classification policy structure that is different than the first 802.1X classification policy structure.

In response to determining that the client device is not an 802.1X supplicant, that the client device is configured for being authenticated using MAC authentication methodology, such MAC authentication methodology is applied to the client device. To this end, in response to the client device successfully passing the MAC authentication, an operation 112 is performed for providing network connectivity via a first MAC classification policy structure. In response to the client device failing the MAC authentication, an operation 114 is performed for providing network connectivity via a second MAC classification policy structure that is different than the first MAC classification policy structure. If the client device is not recognized as an 802.1X supplicant and the MAC authentication methodology is not configured in the policy, an operation 116 is performed for providing network connectivity via a default classification policy structure.

A skilled person will appreciate that the decision to apply the MAC authentication methodology or not is a configuration parameter, not a dynamic decision based on characteristics of the device like 802.1x authentication is. Every device has a MAC address, so every device is configured for being MAC authenticated. Whether or not the MAC authentication method is applied is based on the predetermined configuration of a policy, i.e. the policy chain the administrator of the client device sets up. Correspondingly, in accordance with the present invention, a device having characteristics sufficient for allowing 802.1X authentication is defined herein to be a device configured for 802.1X authentication. It will be further understood by a skilled person that MAC authentication does have success and failure trees. MAC authentication can have policy branches for non-successfully authenticated MAC authenticated devices as well as non-authenticated devices (e.g., where MAC authentication is turned off altogether). However, these branches are different and mutually exclusive such that only one can be configure at a time. Accordingly, in the context of the method 112, passing MAC authentication refers to the condition where the client device successfully authenticates as opposed to the device successfully following the MAC authentication branch.

Figure 2:
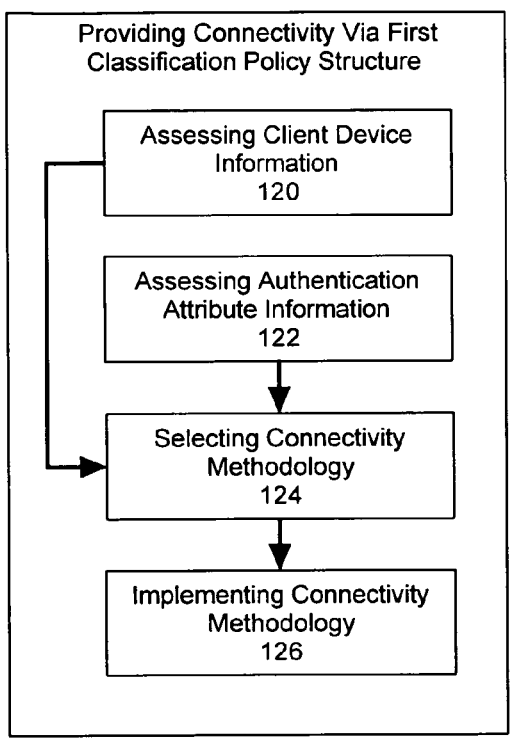
FIG. 2 is a flow chart showing an operation for providing network connectivity via a first classification policy structure in accordance with an embodiment of the present invention.
Figure 3:
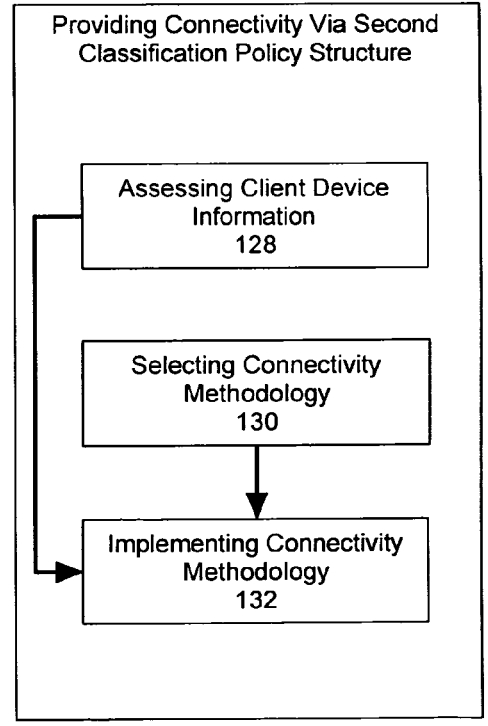
FIG. 3 is a flow chart showing an operation for providing network connectivity via a second classification policy structure in accordance with an embodiment of the present invention.
Figure 4:
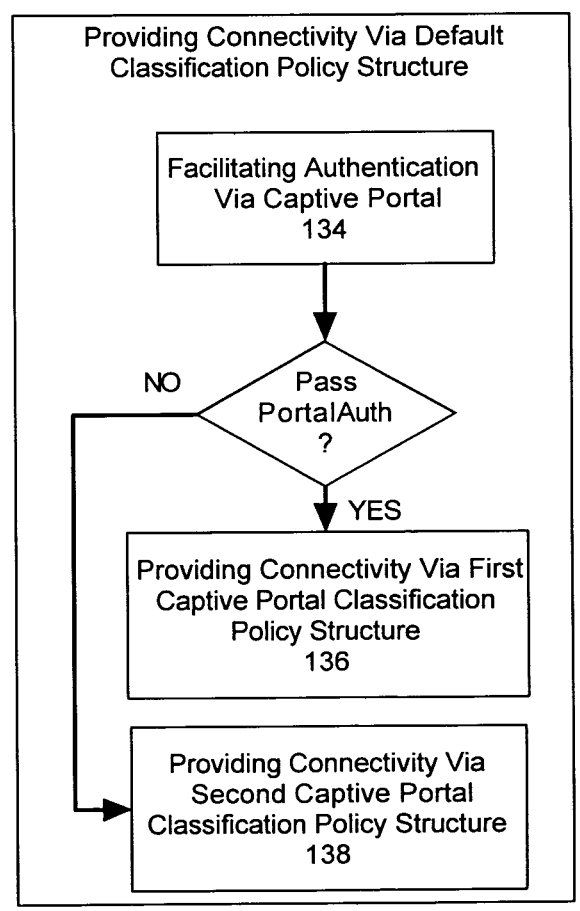
FIG. 4 is a flow chart showing an operation for providing network connectivity via a default classification policy structure in accordance with an embodiment of the present invention.

Referring to FIG. 2, in one embodiment, providing network connectivity via a first classification policy structure (e.g., 802.1X classification policy structure, MAC classification policy structure, etc) includes an operation 120 for assessing client device information (e.g., type of client device, configuration information, etc), performing an operation 122 for assessing authentication attribute information, performing an operation 124 for selecting a connectivity methodology dependent upon the authentication attributes and client device information, and performing an operation 126 for implementing the selected connectivity methodology. It should be noted that the selected connectivity methodology can be the sole connectivity methodology. Referring to FIG. 3, in one embodiment, providing network connectivity via a second classification policy structure (e.g., 802.1X classification policy structure, MAC classification policy structure, etc) includes performing an operation 128 for assessing client device information (e.g., type of client device, configuration information, etc), performing an operation 130 for selecting a connectivity methodology dependent upon client device information, and performing an operation 132 for implementing the selected connectivity methodology. Referring to FIG. 4, in one embodiment, providing network connectivity via a default classification policy structure includes performing an operation 134 for facilitating authentication of the client device via known captive portal authentication techniques. In response to the client device successfully passing the captive portal authentication, an operation 136 is performed for providing network connectivity via a first captive portal classification policy structure. In response to the client device failing the captive portal authentication, an operation 138 is performed for providing network connectivity via a second captive portal classification policy structure that is different than the first captive portal classification policy structure.

In at least one implementation of the present invention, a captive portal policy can be a terminal policy. In such an implementation, the captive portal policy cannot be followed by another policy. However, this does not preclude a captive portal policy from having its own branches for authentication and/or role classifications. Furthermore, it is disclosed herein that facilitating authentication and port assignment in accordance with the present invention can include the functionality of causing one instance of authentication to be followed by another instance of authentication. For example, 802.1x authentication can be followed by with authentication via a captive portal and MAC authentication can be followed by authentication via captive portal. In accordance with embodiments of the present invention, classification of client devices sending tagged frames is supported on 802.1x-authenticated ports. The support is provided for non-supplicants only and is handled by the non-supplicant policies. The latter policies have to be able to handle both tagged and regular (non-tagged) frames so that each non-supplicant atomic policy has its tagged and regular (non-tagged) version. As is discussed below, such policy handling is facilitated via a set of processor executable instructions and a user is not required to have a separate CLI (command Line Interface) command set for tagged frame and one for non-tagged frames.

In general, a tagged frame is processed as a non-tagged frame according to the policy of that port. Before the MAC address of a client device is classified, tagged frames will have an extra check to see if the VLAN to be learned in has the same VLAN id in the tagged frame. If the two VLANs are different, the device is blocked from accessing the port. Just like regular VLAN classification port, a tagged frame on a device classification port is considered as having a match on VLAN classification rule is only when the VLAN as specified in the VLAN ID field of a tagged frame is Mobile tag enabled. Accordingly, the VLAN ID of a tagged frame will be referred to as a "tag VLAN" with respect to the disclosures made herein.

There are two types of client devices with respect to how they use tagged frames. The first type always sends tagged frames to a port and, in accordance with the present invention, is classified with a tagged version of a non-supplicant policy configured on the port. The second type sends both regular (non-tagged) frames as well as the tagged frames. An example of this second type of client device is an Alcatel brand IP (Internet Protocol) telephone that, if configured so, first start by sending regular frames and then tagged frames. Such a client device may be classified based on its regular frames before it even started the tagged frame transmission. As is discussed below in greater detail, in some cases, such a client device will later be reclassified based on the received tagged frames.

In one embodiment of the present invention, six atomic policies are possible for being used in policy chains. These atomic policies are: 802.1x authentication, MAC authentication, VLAN classification rules, VLAN Id, Default VLAN, and Block. 802.1x authentication and MAC authentication involve authentication facilitated by a remote RADIUS server and apply only to supplicants and non-supplicants, respectively. VLAN classification rules, VLAN Id, Default VLAN, and Block can apply to both supplicants and non-supplicants. Default VLAN, and Block are terminal policies, meaning that no other policy can be applied after either one of these two these.

VLAN classification rules, VLAN Id, Default VLAN can be applied in two different a non-strict mode or a strict mode depending, respectively, on whether the device is authenticated or not. In strict mode, classification of a client device into an authenticated VLAN is prohibited. In contrast, in non-strict mode, there is no such restriction so that client devices can be classified into both authenticated and non-authenticated VLANs. MAC authentication, VLAN classification rules, VLAN Id, Default VLAN, can serve to classify client devices sending regular (non-tagged) frames as well as devices sending tagged frames. Accordingly, MAC authentication frames can be tagged and non-tagged, while VLAN classification rules, VLAN Id, Default VLAN frames can be non-strict tagged, non-strict non-tagged, strict tagged, and strict non-tagged.

FIGS. 5-13 include flowcharts showing specific aspects of the different atomic policies and their respective variations. It should be noted that flowcharts of non-terminal policies have extension paths, which are paths that lead to a next policy (i.e., an extension of an original/previous policy). Flowcharts of non-terminal policies may have multiple extension paths but usually have a single extension. Exceptions are 802.1x authentication and MAC authentication flowcharts, which have two extensions each—a first extension path extending to a strict policy and a second extension path extending to a non-strict policy. Note also that a strict policy extends only to a strict policy, or to Block policy. Similarly, a non-strict policy extends only to a non-strict policy or to Block policy.

Figure 5:
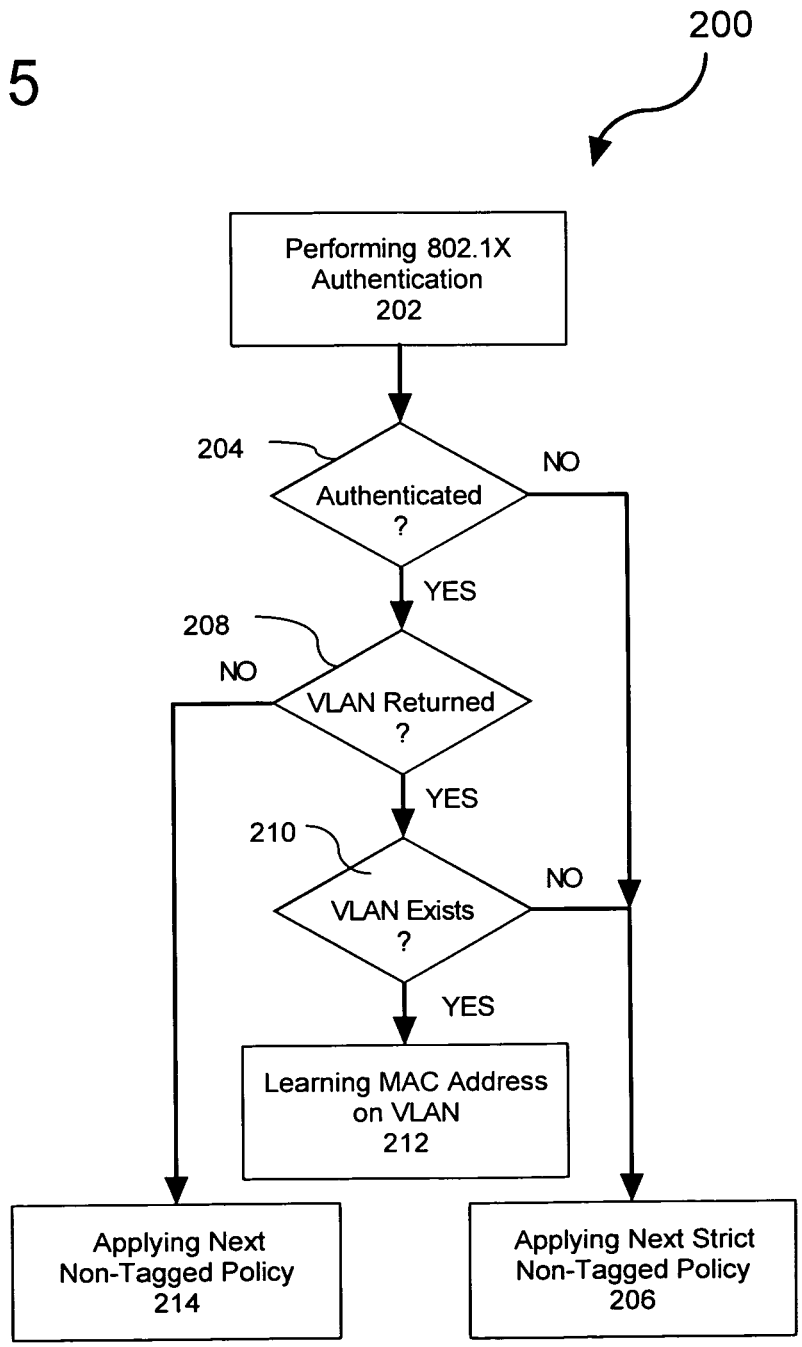
FIG. 5 shows a method for facilitating port assignment using 802.1X authentication in accordance with the present invention.

Referring specifically to FIG. 5, a method 200 for facilitating port assignment using 802.1X authentication is shown. 802.1x Authentication applies to supplicants (i.e., 802.1X client devices) only. At block 202, 802.1X authentication of the user of a client device is facilitated. Facilitating such authentication is done via EAP (Extensible Authentication Protocol) packet exchange between an 802.1x client (user) and a remote RADIUS server, where the switch serves as a relay. The authentication is a MAC enhanced 802.1x variety, because switch adds user's MAC address information to every EAP-Response/Identity packet. The packet is encapsulated in a RADIUS frame and MAC address information is set in Calling-Station-Id RADIUS attribute.

If the authentication is not successful (at block 204), than the next policy in the respective chain is used (at block 206). Depending on the specific architecture configuration, latter policy has to be either strict VLAN Id or Block. In case of a successful authentication (block 204), if the server returns a VLAN Id (block 208) and this VLAN exists (block 210), than the MAC address is learned on this VLAN at block 212. If the returned VLAN does not exist (block 210) than the next policy in the respective chain is used (block 210), in which case, the latter policy has to be as in the failed authentication case. If the server returns no VLAN (block 208) then the next policy in the respective chain is applied (block 214), in which case, the latter policy has to be a non-strict one. As a reference, there are exactly three extension paths and two extensions in the flowchart of FIG. 1.

Figure 6:
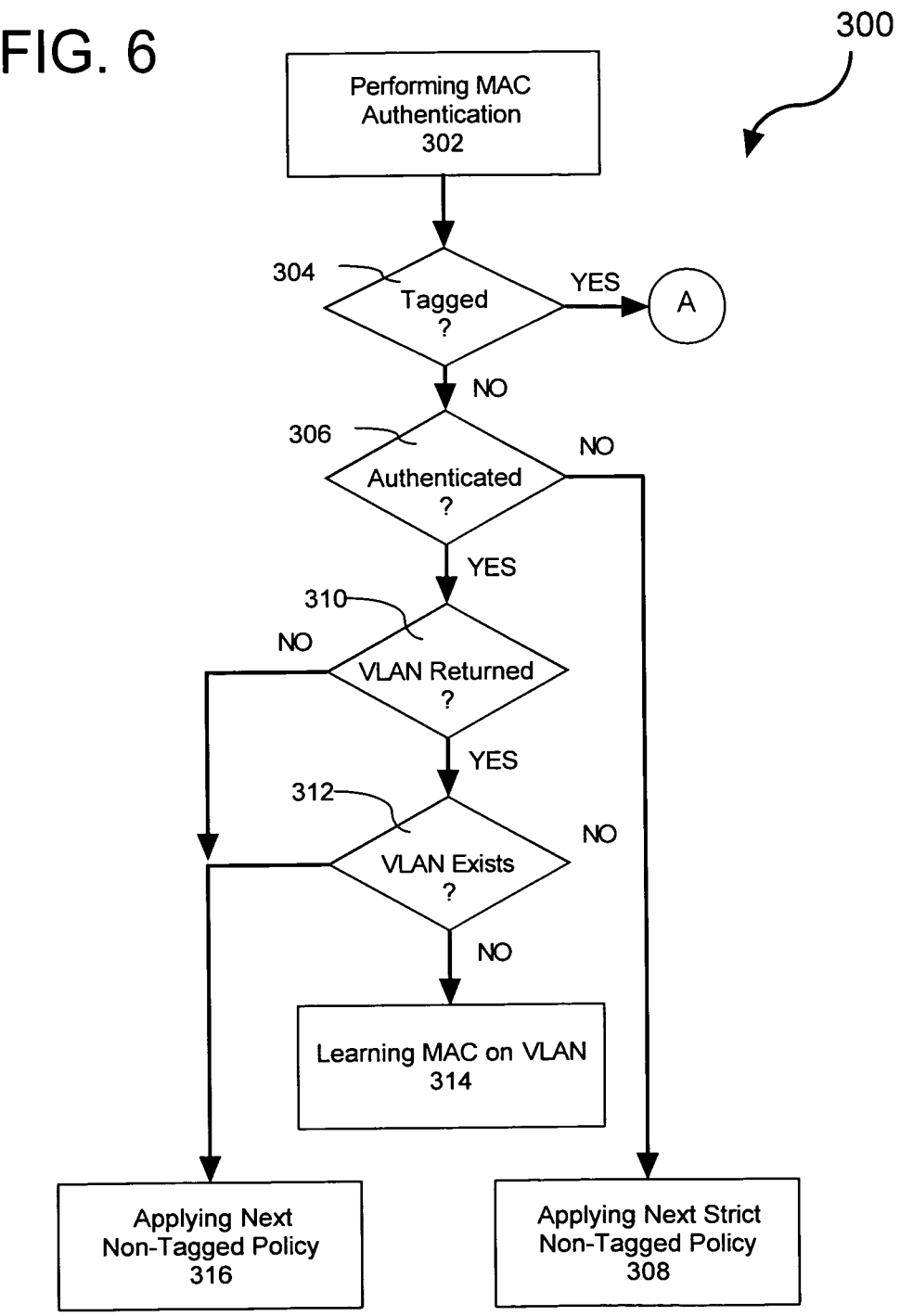
FIGS. 6 and 7 show a method for facilitating port assignment using MAC authentication in accordance with the present invention.
Figure 7:
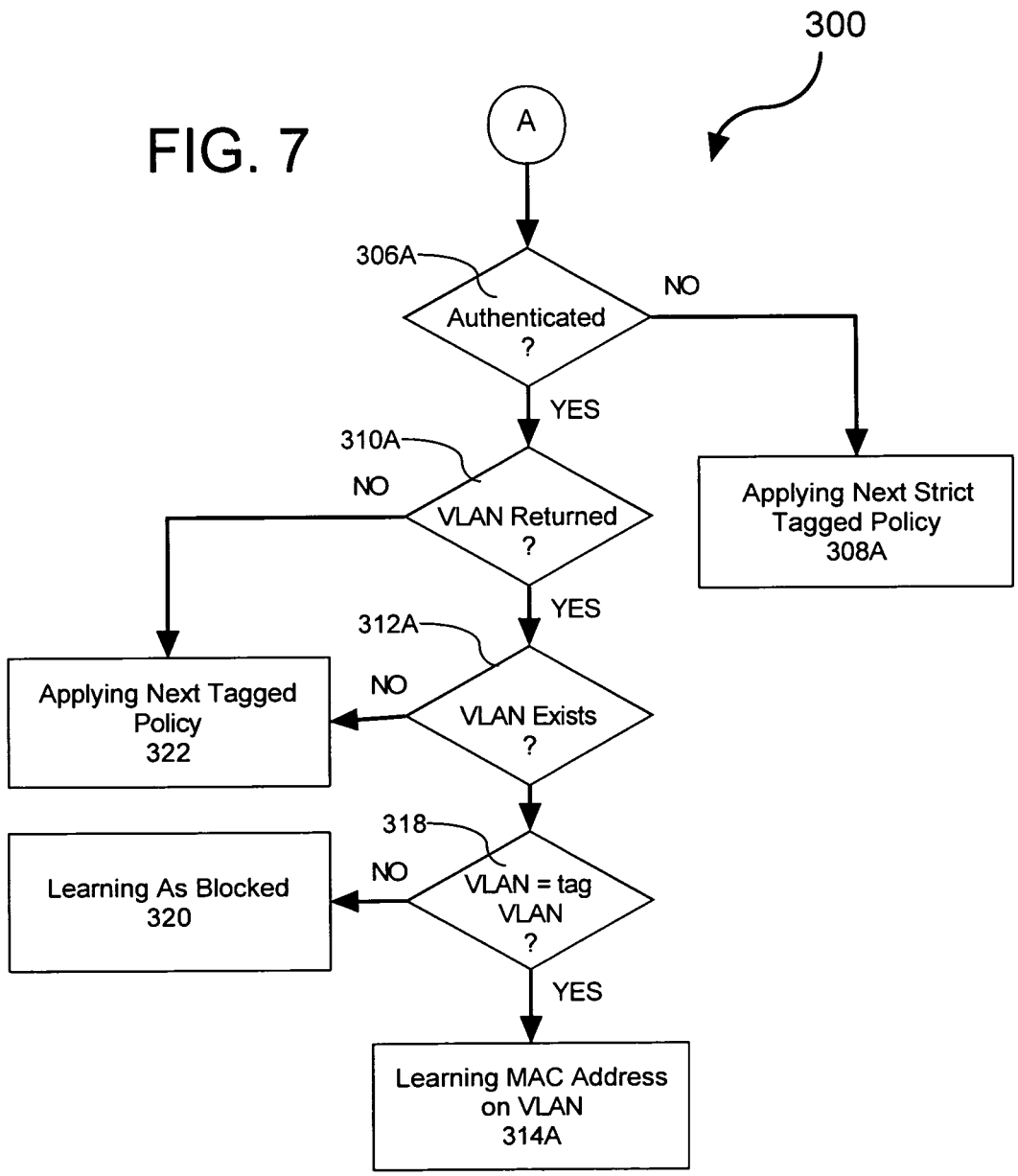

FIGS. 6 and 7 show a method 300 for facilitating port assignment using MAC authentication and such MAC based authentication is a non-supplicant policy only. As with 802.1x authentication, in the case of tagged or non-tagged frames, MAC authentication has two extensions and one path that terminates. This allows for one set of policies to apply if a device has passed authentication but cannot be classified, and a different set of policies to apply if the device has failed authentication. In contrast to 802.1x authentication the case, when the server knows the device but the VLAN returned does not exist, the device is considered to have passed authentication.

As shown in FIG. 6, a silent (passive) authentication of a device is performed (block 302, FIG. 6). Such authentication is performed via a remote RADIUS server. The switch sends MAC address information to the server in a form of a RADIUS frame with MAC address set in both user name and password (i.e., authentication) attributes. Referring first to the case where it is determined that authentication is being performed via non-tagged frames (block 304, FIG. 6) and if the authentication is not successful (block 306, FIG. 6), the next policy in the respective chain is applied (block 308), in which case, the latter policy has to be a strict one or a terminal one. If the authentication is successful (block 306, FIG. 6), the server returned a VLAN (block 312, FIG. 6), and this VLAN exists (block 312, FIG. 6), the MAC address of the device is learned on this VLAN (block 314, FIG. 6). Otherwise, when authentication is successful, the next policy in the respective chain is applied (block 316, FIG. 6), in which case, the latter policy has to be a non-strict non-tagged policy or Block policy. As a reference, there are three extension paths and two extensions in the flowchart of FIG. 6.

Still referring to FIGS. 6 and 7, referring to the case where it is determined that authentication is being performed via tagged frames (block 304, FIG. 6) and if the authentication is not successful (block 306A, FIG. 7), the next policy in the respective chain is applied (block 308A, FIG. 7), in which case, the latter policy has to be a strict one or a terminal one. If the authentication is successful (block 306A, FIG. 7), the server returned a VLAN (block 310A, FIG. 7), this VLAN exists (block 312A, FIG. 7) and this VLAN is equal to the tag VLAN (block 318 FIG. 7), the MAC address of the device is learned on this VLAN (block 314A). If the authentication is successful (block 306A, FIG. 7), the server returned a VLAN (block 310A, FIG. 7), this VLAN exists (block 312A, FIG. 7) and this VLAN is not equal to the tag VLAN (block 318 FIG. 7), the MAC address of the device is learned as blocked (block 320, FIG. 7). When the device is successfully authenticated and a VLAN is not returned (block 310A, FIG. 7) or when the server returns a VLAN (block 310, FIG. 7) but that VLAN does not exist (block 312A, FIG. 7), a the next policy in the respective chain is applied (block 322), in which case, the latter policy has to be a non-strict one or a terminal one. As a reference, there are four extension paths and two extensions in the flowchart of FIG. 7.

Figure 8:
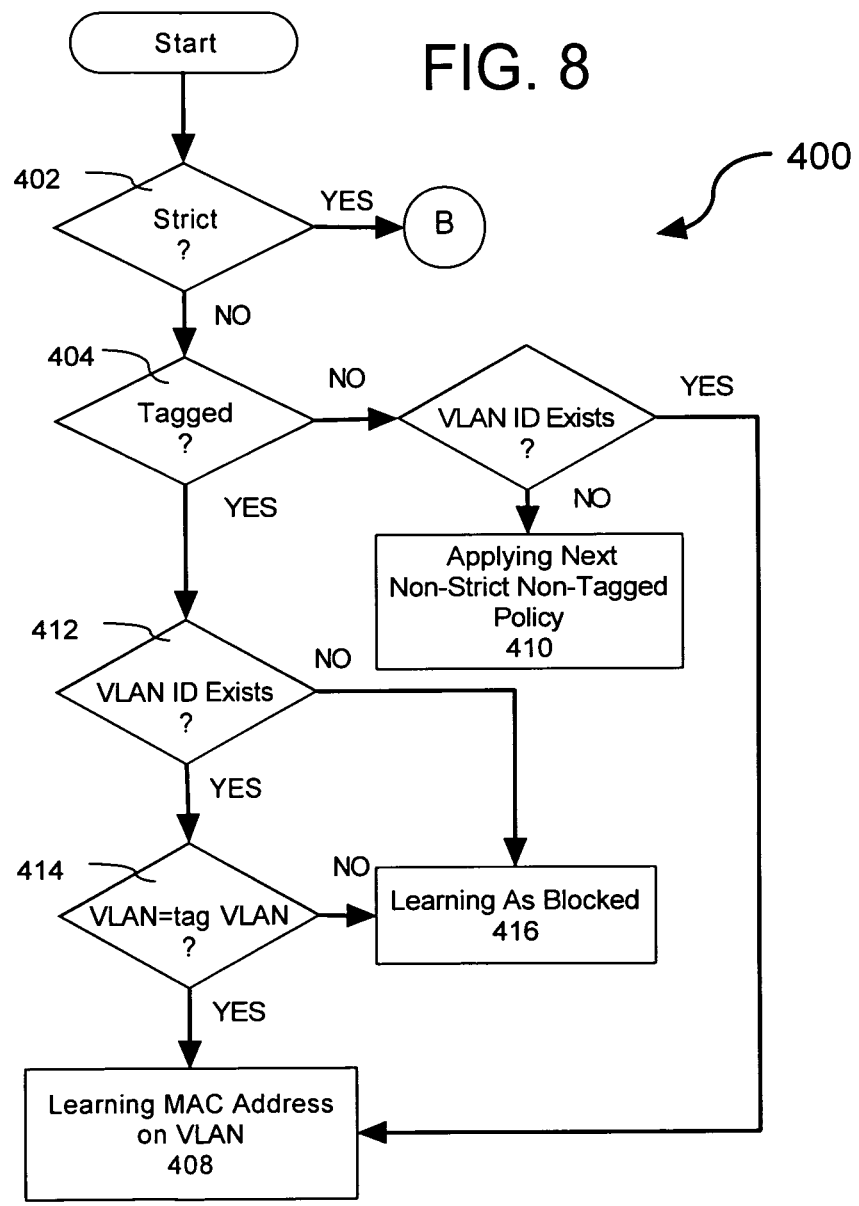
FIGS. 8 and 9 show a method for facilitating port assignment using VLAN identification in accordance with the present invention.
Figure 9:
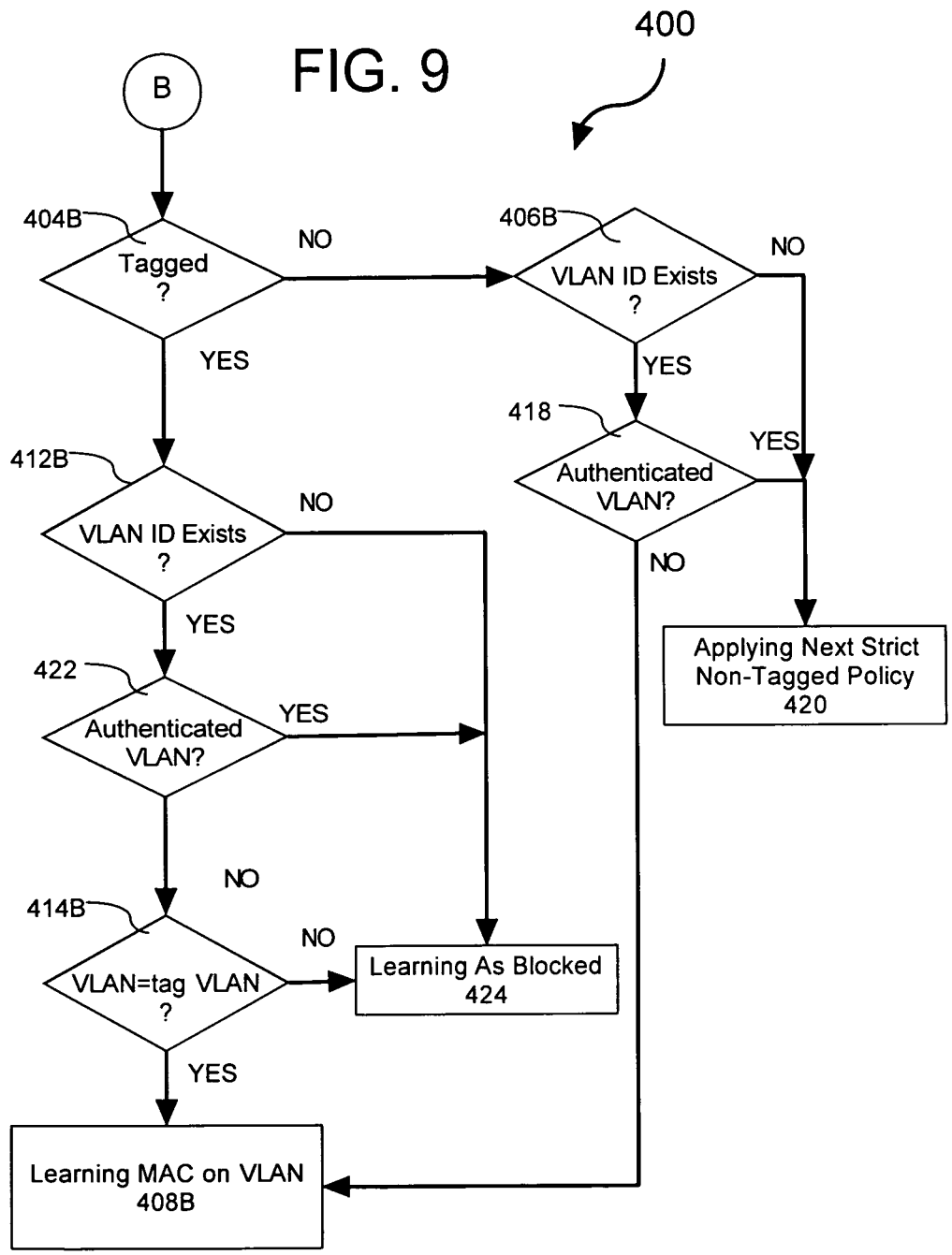

FIGS. 8 and 9 show a method 400 for facilitating port assignment using VLAN identification (Id). VLAN Id is a non-terminal policy that may apply to both supplicants (non-tagged frames) and non-supplicants (tagged and non-tagged frames). It allows for the MAC address of a device to be learned on any VLAN of choice, thus, adding another layer of flexibility. One can create a VLAN to place all non-supplicants accessing 802.1x authenticated ports. Such a VLAN was known as a Guest VLAN. One may also create a VLAN to place all supplicants that failed authentication (i.e., a Fail VLAN). The Failed VLAN has to be a non-authenticated VLAN so that a strict type of VLAN Id policy is used. This policy acts as a terminal policy in this context because its only legal extension is Block policy. Furthermore, this policy behaves differently with tagged and non-tagged frames and may also be implemented as a strict or a non-strict one. Thus, there are four types of VLAN Id policies: non-strict non-tagged, non-strict tagged, strict non-tagged, and strict tagged.

Referring to FIG. 8, VLAN Id port assignment for a device determined to be non-strict (block 402) and determined to be non-tagged (block 404), which is referred to herein as a non-strict, non-tagged VLAN Id policy, is shown. Such a policy applies to supplicants and non-supplicants and attempt to classify the device sending non-tagged frames into a chosen VLAN. If the chosen VLAN exists (block 406), the device is classified into that VLAN (block 408). Otherwise, the next policy in the respective chain is applied (block 410). As a reference, there is exactly one extension path and one extension in the non-strict, non-tagged portion of the flowchart in FIG. 8, and the extension is to a non-strict non-tagged policy or Block policy.

Still referring to FIG. 8, VLAN Id port assignment for a device determined to be non-strict (block 402) and determined to be tagged (block 404), which is referred to herein as a non-strict, tagged VLAN Id policy, is shown. Such a policy applies to supplicants and non-supplicants and is similar in behavior to that of the non-strict, non-tagged VLAN Id policy case, except that the device has to be a non-supplicant sending tagged frames. Accordingly, both the existence of the chosen VLAN (block 412) as well as whether the latter VLAN is the same as the tag VLAN (block 414) is checked. If the checks are positive, the device is classified into the chosen VLAN (block 408). Otherwise, if either of the checks is negative, the device is learned as BLOCKED on the tag VLAN (block 416). As a reference, there are two extension paths and one extension in the non-strict, tagged portion of the flowchart in FIG. 8. (FIG. 3), and the extension is to a non-strict tagged policy or to Block policy.

Referring to FIGS. 8 and 9, VLAN Id port assignment for a device determined to be strict (block 402, FIG. 8) and determined to be non-tagged (block 404B), which is referred to herein as a strict non-tagged VLAN Id policy, is shown. This policy is similar in behavior to the non-strict non-tagged VLAN Id policy above except that the existence of the VLAN does not guaranty classification of the device. If the chosen VLAN exists (block 406B, FIG. 9) and the VLAN is not an authenticated one (block 418, FIG. 9), the device is classified into that VLAN (block 408B, FIG. 9). Otherwise, if the VLAN does not exist or the VLAN is authenticated, the next policy in the respective chain is applied (block 420, FIG. 9). As a reference, there are two extension paths and one extension in the strict tagged portion of the flowchart of FIGS. 8 and 9, and the extension is to another strict non-tagged policy or to Block policy.

Referring to FIGS. 8 and 9, VLAN Id port assignment for a device determined to be strict (block 402, FIG. 8) and determined to be tagged (block 404B), which is referred to herein as a strict tagged VLAN Id policy, is shown. This policy is similar in behavior to the non-strict tagged VLAN Id policy above except that the existence of the VLAN does not guaranty classification of the device. Accordingly, the existence of the chosen VLAN (block 412B, FIG. 9), whether the VLAN is authenticated (block 422, FIG. 9), and whether the VLAN is the same as the tag VLAN (block 414B, FIG. 9) are all checked. If VLAN exists (block 412B, FIG. 9), is not authenticated (block 422, FIG. 9), and is the same as the tag VLAN (block 414B, FIG. 9), the device is classified into the chosen VLAN (block 408B, FIG. 9). Otherwise, if VLAN does exists (block 412B, FIG. 9), is authenticated (block 422, FIG. 9), or is not the same as the tag VLAN (block 414B, FIG. 9), the device is learned as BLOCKED on the tag VLAN (block 424, FIG. 9), in which case the device is classified only if the VLAN is not an authenticated one. As a reference, there are three extension paths and one extension in the strict tagged portion of the flowchart of FIGS. 8 and 9, and the extension is to another strict tagged policy or to Block policy.

Figure 10:
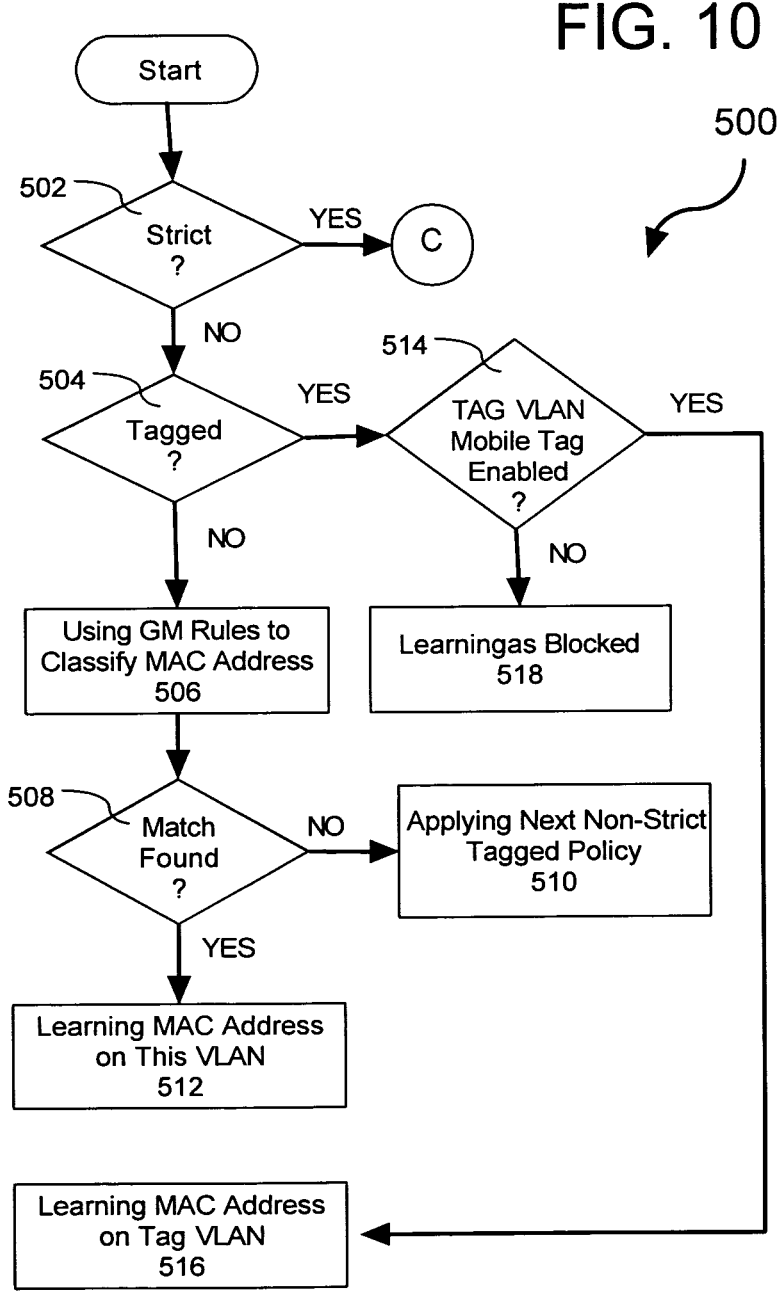
FIGS. 10 and 11 show a method for facilitating port assignment using VLAN classification rules in accordance with the present invention.
Figure 11:
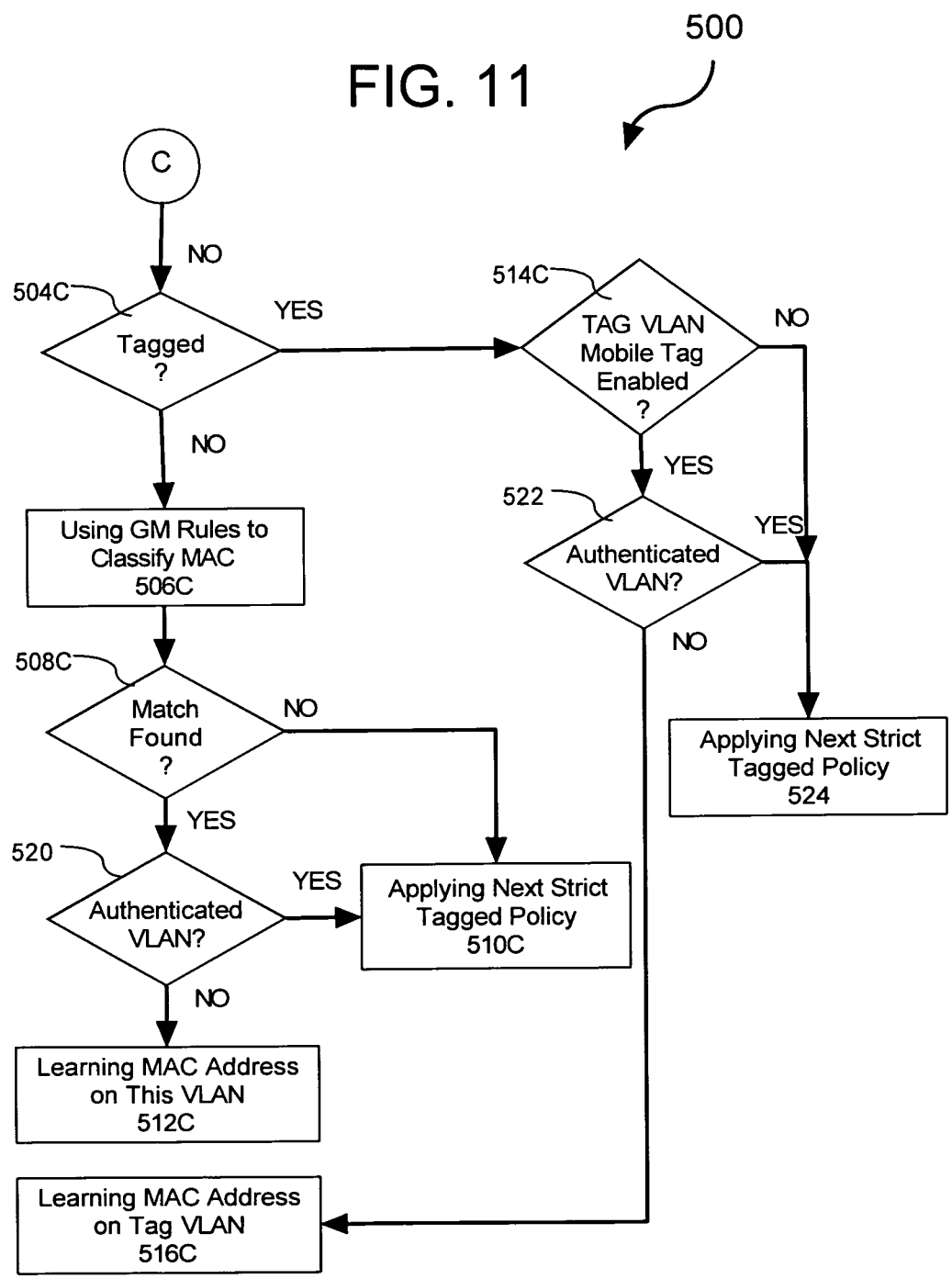

FIGS. 10 and 11 show a method 500 for facilitating port assignment using VLAN classification rules (also known as Group Mobility rules). VLAN classification rules policy is a non-terminal policy that comes in four types: non-strict non-tagged, non-strict tagged, strict non-tagged, and strict tagged. In a regular VLAN classification port, DHCP (Dynamic Host Configuration Protocol) rules are utilized to classify a MAC to a VLAN. For device classification in accordance with the present invention, having a matching DHCP rule is not considered as having a matching VLAN classification rule when the device classification Policy of a port is applied and thus, in such instances, will move on to the next policy of the respective chain.

Referring to FIG. 10, VLAN classification port assignment for a device determined to be non-strict (block 502) and determined to be non-tagged (block 504), which is referred to herein as a non-strict non-tagged VLAN classification policy, is shown. This policy handles devices, supplicants or non-supplicants, sending non-tagged frames and uses VLAN classification rules (block 506) for determining their classification. If there is no matching rule (block 508), a next policy in the respective chain is applied (block 510). If there is a matching rule (block 508), the device is classified accordingly (block 512) such as by leaning the MAC address on the VLAN. If the devices MAC address matches such a rule then the rule is skipped and the search is continued. As a reference, there is one extension path and one extension in the non-strict, non-tagged portion of the flowchart of FIG. 10, and the extension is to another non-strict non-tagged policy or to Block policy.

Still referring to FIG. 10, VLAN classification port assignment for a device determined to be non-strict (block 502) and determined to be tagged (block 504), which is referred to herein as a non-strict tagged VLAN classification policy, is shown. This policy attempts to classify devices that are non-supplicants sending tagged frames. It does not use VLAN classification rules, but a simple check if the tag VLAN is mobile tag enabled (block 514). If the tag VLAN is mobile tag enabled, the device is treated as if there is a matching VLAN classification rule such that the device is classified into the tag VLAN (block 516). Otherwise, the device is learned as blocked (block 518). As a reference, there is one extension path and one extension in the non-strict tagged portion of the flowchart of FIG. 10, and the extension is to another non-strict tagged policy or to Block policy.

Referring to FIGS. 10 and 11, VLAN classification port assignment for a device determined to be strict (block 502) and determined to be non-tagged (block 504C), which is referred to herein as a strict non-tagged VLAN classification policy, is shown. This policy is similar in behavior to the non-strict non-tagged policy VLAN classification policy in that it uses VLAN classification rules to classify the device (block 506, FIG. 11). However, it works only with non-supplicants and a matching rule does not guarantee that the device would be classified. The device is classified only if the related VLAN is a non-authenticated one. If there is no matching rule (block 508C, FIG. 11) or the VLAN is authenticated, a next policy in the respective chain is applied (block 510C, FIG. 11). If there is a matching rule (block 508C, FIG. 11) and the VLAN is not authenticated (block 520, FIG. 11), the device is classified accordingly (block 512C, FIG. 11) such as by leaning the MAC address on the VLAN. As a reference, there are two extension paths and one extension in the strict non-tagged portion of the flowchart of FIG. 11, and the extension is to another strict non-tagged policy or to Block policy.

Referring to FIGS. 10 and 11, VLAN classification port assignment for a device determined to be strict (block 502) and determined to be tagged (block 504C), which is referred to herein as a strict tagged VLAN classification policy, is shown. This policy is similar in behavior to the non-strict tagged VLAN classification policy, as it checks if the tag VLAN is mobile tag enabled. However, a positive check does not guarantee that the device would be classified. The device is classified only if the tag VLAN is a non-authenticated one. It does not use VLAN classification rules, but a simple check if the tag VLAN is mobile tag enabled (block 514C, FIG. 11). If the tag VLAN is mobile tag enabled (block 514C, FIG. 11) and the tag VLAN is not authenticated (block 522, FIG. 11), the device is treated as if there is a matching VLAN classification rule such that the device is classified into the tag VLAN (block 516C, FIG. 11). Otherwise, if the tag VLAN is not mobile tag enabled (block 514C, FIG. 11) or the tag VLAN is authenticated (block 522, FIG. 11), a next policy in the respective chain is applied (block 524, FIG. 11). As a reference, there are two extension paths and one extension in the strict tagged portion of the flowchart of FIGS. 10 and 11, and the extension is to another strict non-tagged policy or to Block policy.

Still referring to VLAN classification port assignment, as mentioned above, there are devices that first sends regular frames and later switches to the tagged ones. Such a device may be first classified based on the regular frames and later reclassified based on the tagged ones. The rule for re-classification is as follows: a.) tagged VLAN has to be mobile tag enabled; b.) the device has originally been classified via a VLAN classification rules policy; c.) if the device is previously authenticated via an authentication server then it will be classified to the VLAN on tagged frame; and d.) if the device has not been previously authenticated then the device can only be re-classified if the VLAN on the tagged frame is not authentication enable.

Figure 12:
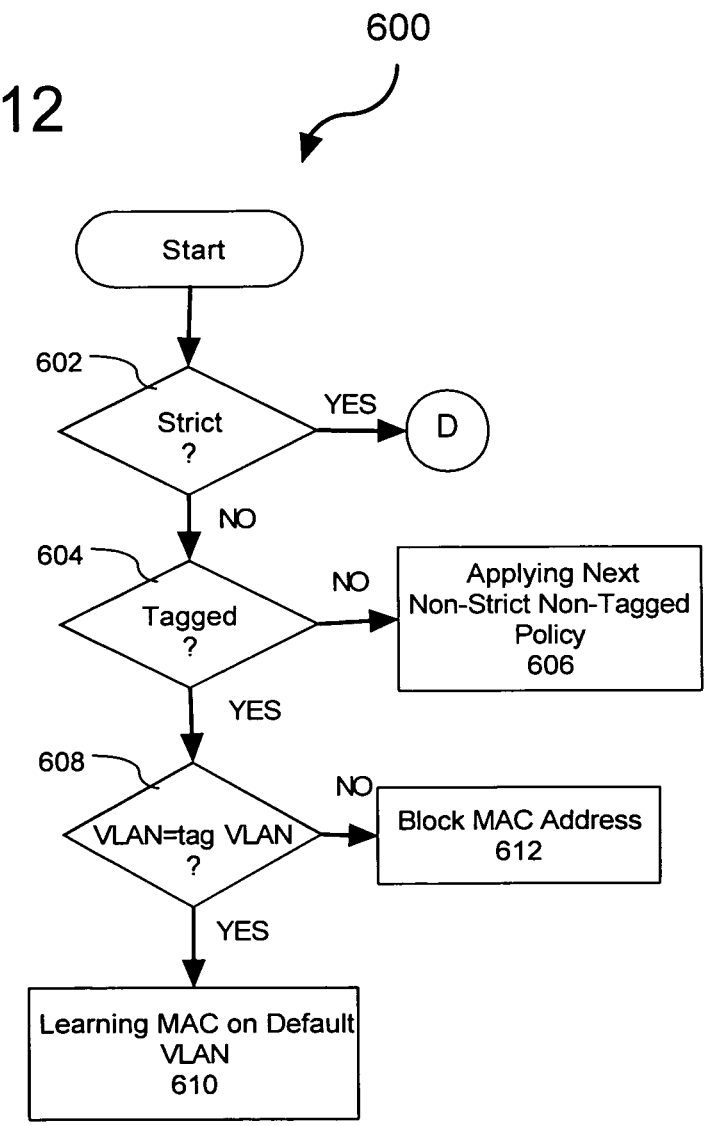
FIGS. 12 and 13 show a method for facilitating port assignment using default VLAN rules in accordance with the present invention.
Figure 13:
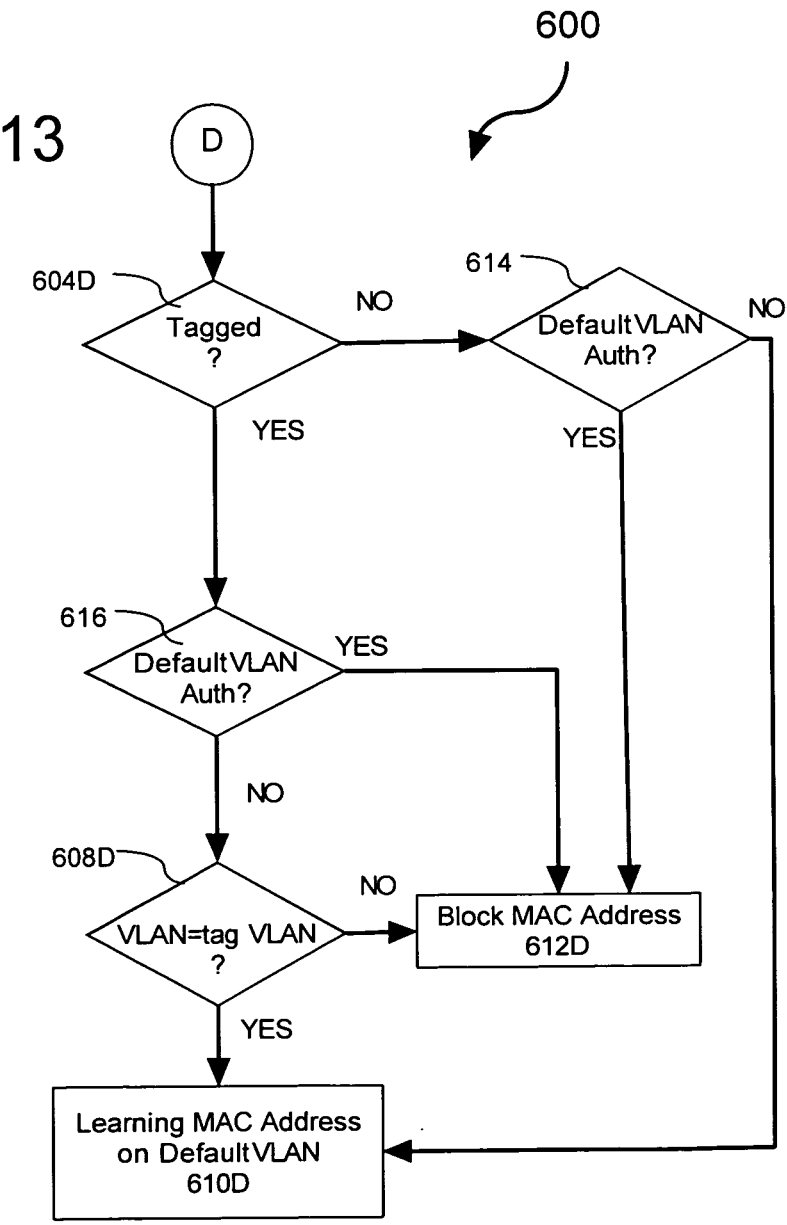

FIGS. 12 and 13 show a method 600 for facilitating port assignment using default VLAN rules. Default VLAN is a terminal policy that places the MAC address of a VLAN into a default VLAN of a port. Because the default VLAN of a port can be an authenticated VLAN, a strict version of this terminal policy is required. Consequently, the policy comes in four types: non-strict non-tagged, non-strict tagged, strict non-tagged, and strict tagged.

Referring to FIG. 12, default VLAN port assignment for a device determined to be non-strict (block 602) and determined to be non-tagged (block 604), which is referred to herein as a non-strict non-tagged default VLAN policy, is shown. This policy is a terminal policy that applies to both supplicants and non-supplicants that are sending regular (non-tagged) frames. It simply places the device's MAC address into the default VLAN of the port (block 606).

Still referring to FIG. 12, default VLAN port assignment for a device determined to be non-strict (block 602) and determined to be tagged (block 604), which is referred to herein as a non-strict tagged default VLAN policy, is shown. This policy is a terminal policy that applies to non-supplicants sending tagged frames only. If the latter VLAN is matching the tag VLAN (block 608), the MAC address of the device is placed into the default VLAN of the port (block 610). Otherwise, the MAC address is blocked (block 612).

Referring to FIGS. 12 and 13, default VLAN port assignment for a device determined to be strict (block 602) and determined to be non-tagged (block 604D), which is referred to herein as a strict non-tagged default VLAN policy, is shown. This policy is a terminal policy that applies to non-supplicants sending non-tagged frames only. It places the MAC address of the device into the default VLAN of the port (block 610D, FIG. 13) if the latter VLAN is not an authenticated variety (block 614, FIG. 13). Otherwise, the MAC address is blocked (612D, FIG. 13).

Referring to FIGS. 12 and 13, default VLAN port assignment for a device determined to be strict (block 602) and determined to be tagged (block 604D), which is referred to herein as a strict tagged default VLAN policy, is shown. This policy is a terminal policy that applies to non-supplicants sending tagged frames only. If the latter VLAN is not an authenticated variety (block 616, FIG. 13) and matches the tag VLAN (block 608D, FIG. 13), the MAC address of the device is placed into the default VLAN of the port (block 610D, FIG. 13). Otherwise, if the latter VLAN is an authenticated variety (block 616, FIG. 13) or does not match the tag VLAN (block 608D, FIG. 13), the MAC address is blocked (block 612D, FIG. 13).

Turning now to a discussion of port and policy configuration for allowing port assignment in accordance with the present invention, in order for device classification policies to be used on a dedicated port, the port has to be configured as 802.1x authenticated. This includes configuring VLAN classification so that the port is declared as mobile and 802.1x authenticated. For MAC based authentication feature in particular system level configuration of is done in Authentication Authorization and Accounting module. This includes configuring a list of RADIUS servers to provide MAC based authentication in AAA. This list may be different than the list of servers for 802.1x authentication. Note that the two lists may also be the same if so chosen to configure them this way. The configuration of supplicant and non-supplicant compound policies is done in 802.1x handler.

With respect to policy configuration, atomic policies are combined into chains and optionally into trees for creating a compound policy. In at least one embodiment of the present invention, there are several rules that need to be followed to properly configure a compound policy. A first one of these rules is that an atomic policy of a certain type can appear only once in the compound policy (i.e., no repetition is allowed). A second one of these rules is that a strict atomic policy can only be extended with another strict atomic policy or with Block policy. A third one of these rules is that a non-strict atomic policy can only be extended with another non-strict policy or with Block policy. A fourth one of these rules is that a tagged atomic policy can only be extended with another tagged atomic policy or with Block policy. A fifth one of these rules is that a non-tagged atomic policy can only be extended with another non-tagged atomic policy or with Block policy. A sixth one of these rules is that a compound policy has to terminate. A seventh one of these rules is that, if the compound policy does not terminate, that is not the case a default terminal atomic policy is appended. An eighth one of these rules is that a maximum of 3 VLAN Id policies are allowed in a compound policy.

It should be noted that default terminal policy is Block. It should also be noted that, for the purpose of rule 1 above, two VLAN Id policies are considered different if they are referring to different VLANs.

There are additional rules for configuring non-supplicant compound policies. A first one of these rules is that a supplicant atomic policy cannot be part of a non-supplicant compound policy. A second one of these rules is that if MAC authentication is one of the atomic policies in the compound policy chain/tree, then it has to be the first policy. A third one of these rules is that a strict policy or Block policy is the first policy otherwise.

There are additional rules for configuring supplicant compound policies. A first one of these rules is that a non-supplicant atomic policy cannot be part of a supplicant compound policy. A second one of these rules is that 802.1x authentication policy has to be the first policy in the compound policy chain. A third one of these rules is that a Strict VLAN Id policy has to be followed by Block.

Turning now to a discussion on basic architecture of a system in accordance with the present invention, device authentication functionality is unchanged except for the addition of device authentication/classification feature in accordance with the present invention. The authentication process on an 802.1x port starts in the same way as with the existing 802.1x authentication. On the port up event, an EAP-Request/Identity frame is sent to 802.1x group MAC address in order to solicit start of authentication from supplicants connected to the port. After that, EAP-Request-Identity frames are sent only to the specific MAC addresses of the devices sending data traffic on the port. This will trigger the start of the authentication if a device is a supplicant. The device should return an EAP-Response/Identity frame to start the authentication. If no EAP-Response/Identity is received, after a number of tries, the device is a non-supplicant and by default is blocked. This behavior may now be changed as a chain of non-supplicant classification policies may be configured on the port. Depending on what is configured, the device may be placed into a configured VLAN classified according to VLAN classification rules or MAC authenticated among other things. In the latter case, the device's MAC address is checked for validity to find out if it should be learned and on which VLAN. A RADIUS server, specially configured for MAC based authentication, performs the authentication itself. The server gets a RADIUS frame, with the MAC address of the device featured as both the user name and password, from the switch. This functionality is similar to how one or more known VLAN authentication applications are currently using RADIUS server for authentication. No vendor-specific or standard attribute, which is not currently supported, is needed for RADIUS to operate in accordance with the present invention. If the MAC address of the device is known and RADIUS server returned a VLAN and the VLAN exists, the MAC is learned on this VLAN whereby the device is authorized to the traffic on this port.

Presented now are a different examples of different configurations of supplicant and non-supplicant compound classification policies. In view of the disclosures made herein, it will be appreciated by a skilled person that these examples are far from being comprehensive or enumerative and that there are many examples not covered here that are within the scope of the disclosures made herein and/or appended claims. Furthermore, a skilled person will appreciate that these are examples depicting of how to achieve respective functionality, and that the same or sufficiently similar functionality can be achieved through different variations of CLIs.

Example 1

Command is 802.1x slot/port non-supplicant policy authentication pass group-mobility default-vlan fail vlan 10 [block], which sets the policy for non-supplicants. The policy treats tagged and non-tagged frames differently.

Figure 14:
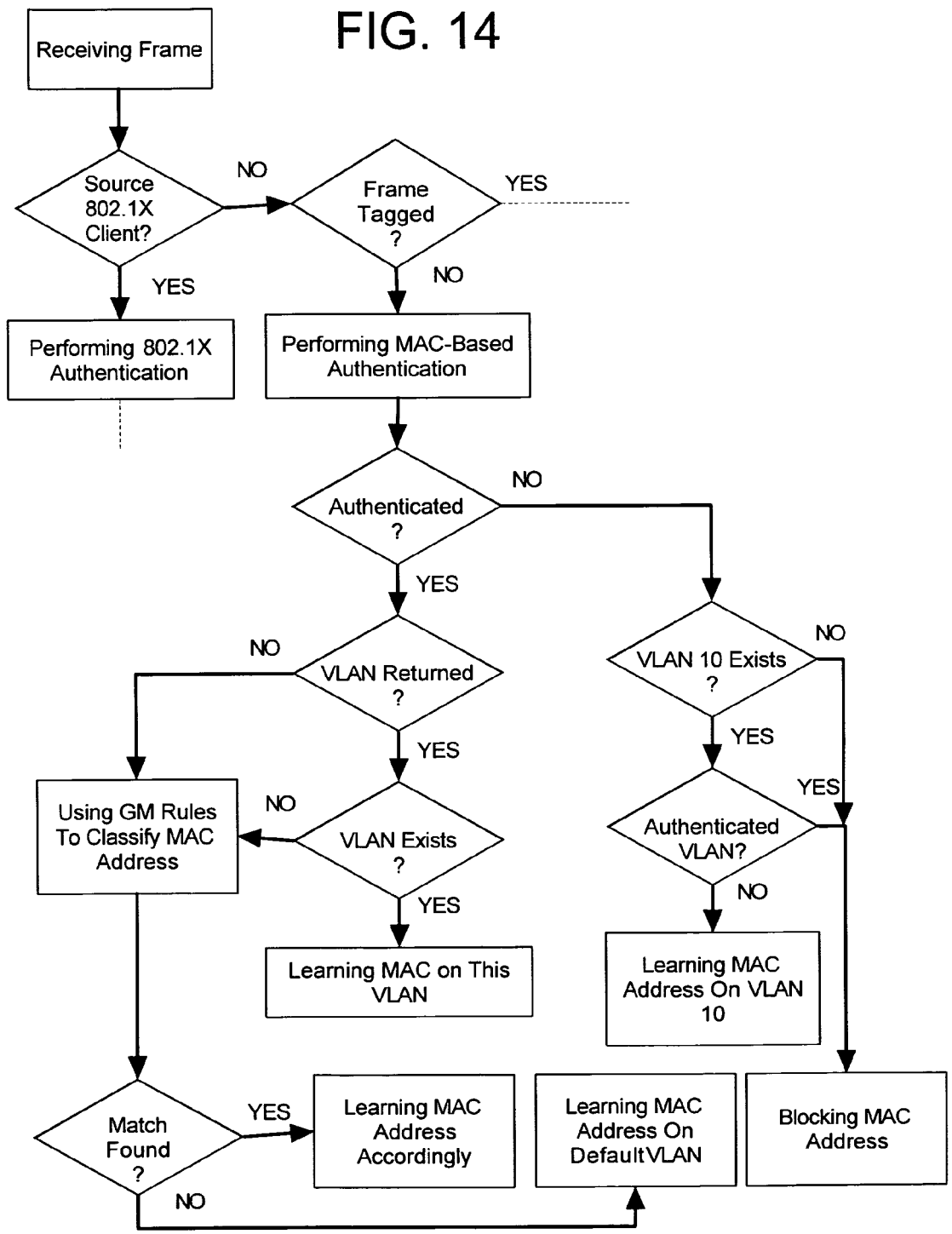
FIGS. 14 and 15 show a flow chart relating to a first example of a compound classification policy in accordance with the present invention.

In the non-tagged case, as shown in FIG. 14, MAC authentication is performed first. If the device passed authentication, but is not classified, VLAN classification rules are applied. If no rule matches, then the device's MAC is learned on the default VLAN. If the device fails authentication, then its MAC is learned on VLAN 10, provided that it exists and is not an authenticated VLAN. The device's MAC is blocked otherwise.

Figure 15:
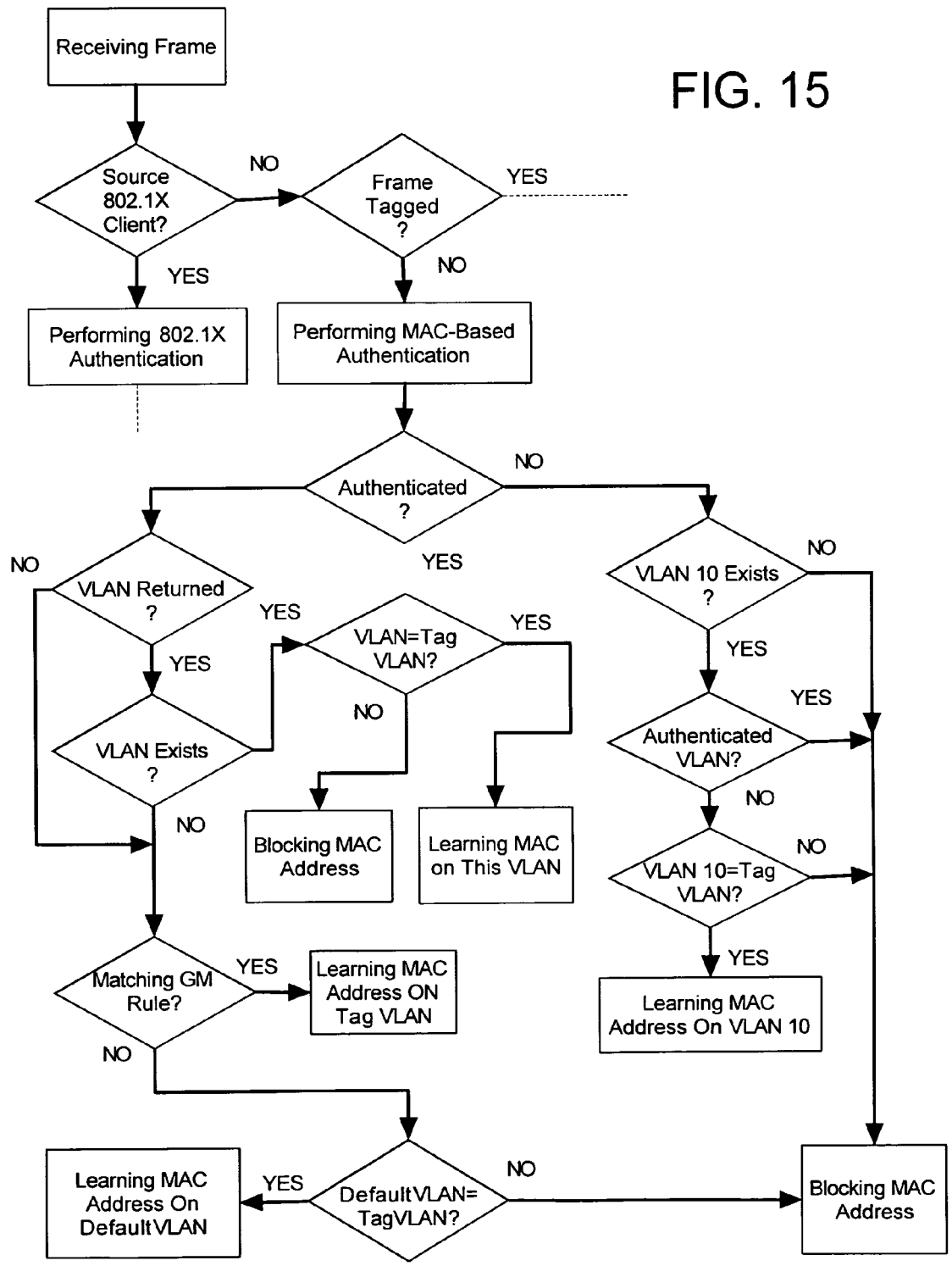

In the tagged case, as shown in FIG. 15, MAC authentication is performed first. If the device passed authentication and the VLAN is returned then the device is classified only if the VLAN exists and matches the tag VLAN. If the two do not match the device is blocked. If no VLAN is returned or the returned VLAN does not exist then the device is classified into tag VLAN if the latter is mobile tag enabled. This is the case because the policy that comes after successful authentication is VLAN classification and having the tag VLAN mobile tag enabled is equivalent to having a matching rule. If tag VLAN is not mobile tag enabled the device's MAC is learned on the default VLAN provided that it matches the tag VLAN. If the two do not match the MAC is blocked. If the device fails authentication, then its MAC is learned on VLAN 10, provided that it exists, matches tag VLAN and is not an authenticated VLAN. The device's MAC is blocked otherwise.

Example 2

Command is 802.1x slot/port non-supplicant policy authentication vlan 10 default-vlan, which sets policies for non-supplicants. The policy treats tagged and non-tagged frames differently.

Figure 16:
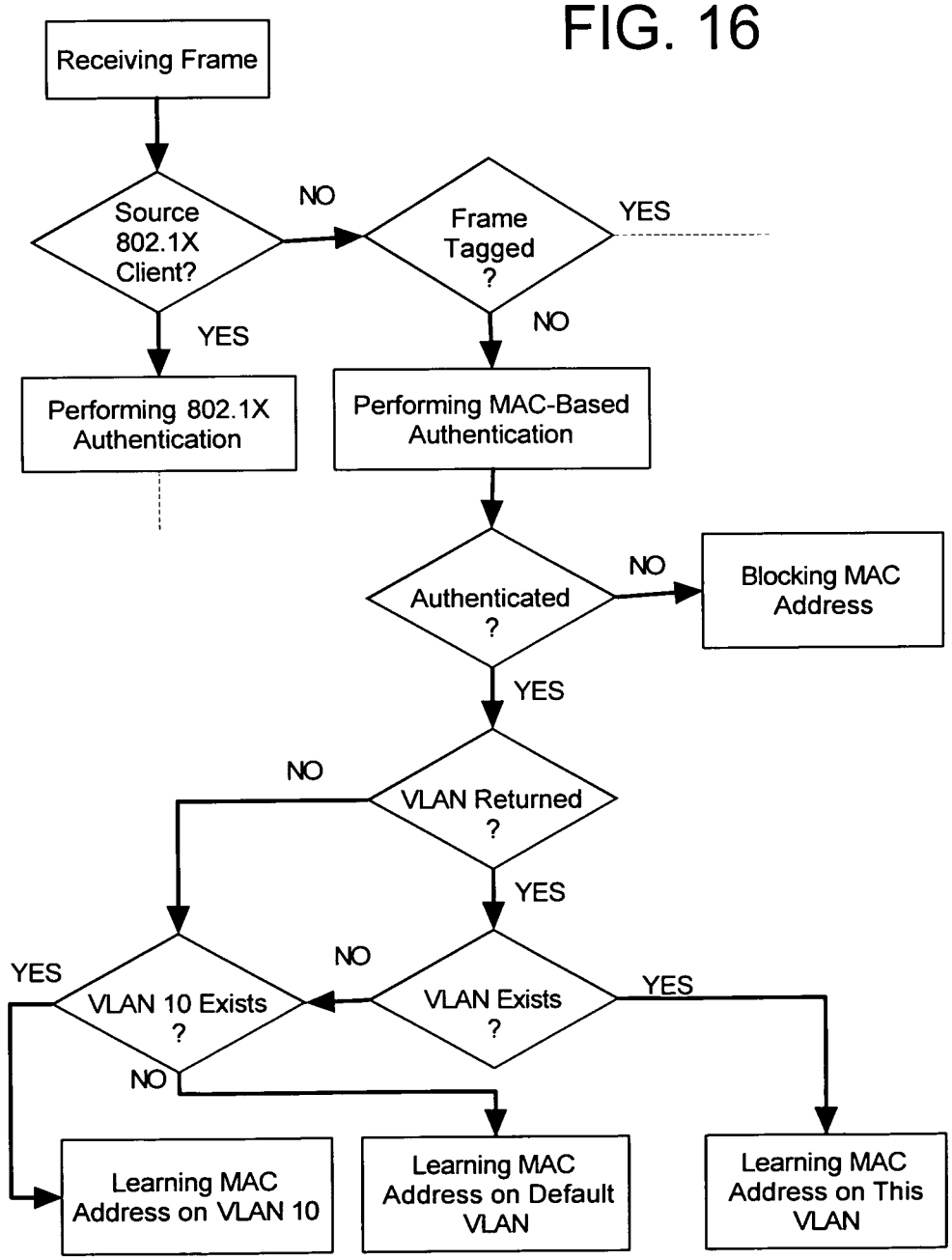
FIG. 16 shows a flow chart relating to a second example of a compound classification policy in accordance with the present invention.

In the non-tagged case, as shown in FIG. 16, MAC authentication is performed first. If the device passed authentication, but could not be classified, then its MAC is learned on VLAN 10, provided that the latter VLAN exists. If VLAN 10 is not configured then the device's MAC is learned on the default VLAN of the port. If the device failed the authentication it is blocked. It should be noted that, if the keywords 'pass' and 'fail' are omitted, it is assume that the chain is related to the 'pass' case, whereas, for the 'fail' case, it is assumed the default terminal policy (Block).

In the tagged case (not specifically shown), MAC authentication is performed first. If the device passed authentication and the VLAN is returned then the device is classified only if the VLAN exists and matches the tag VLAN. If the two do not match the device is blocked. If no VLAN is returned or the returned VLAN does not exist then the device is classified into VLAN 10 provided that the latter VLAN exists and matches the tag VLAN. If the two do not match the device is blocked. If the device failed authentication it is blocked.

Example 3

Command is 802.1x slot/port non-supplicant policy authentication fail vlan 100 default-vlan, which sets policies for non-supplicants. MAC authentication is performed first. The policy treats tagged and non-tagged frames differently.

Figure 17:
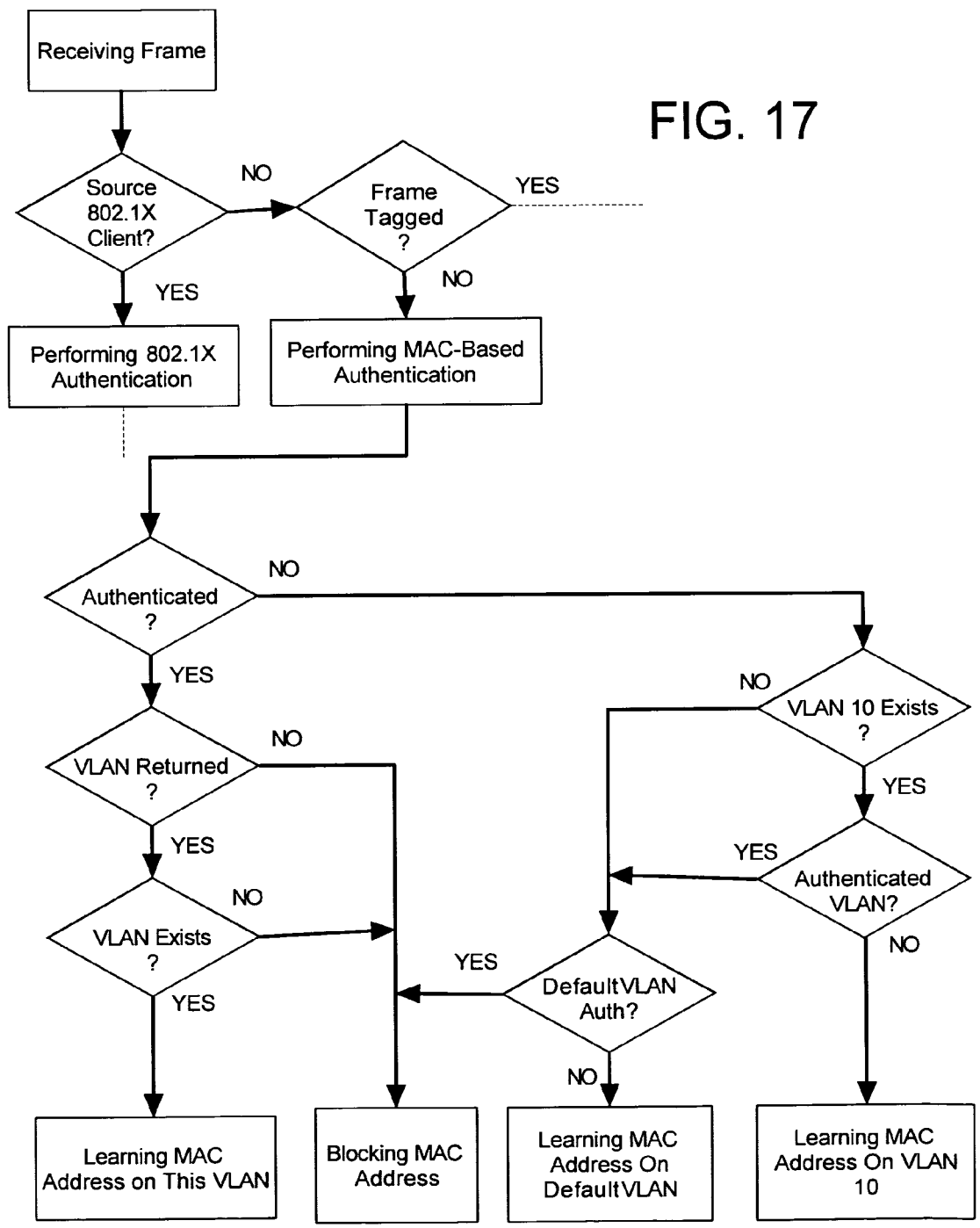
FIG. 17 shows a flow chart relating to a third example of a compound classification policy in accordance with the present invention.

In the non-tagged case, as shown in FIG. 17, MAC authentication is performed first. If the device passed authentication, but is not classified, then its MAC is blocked. If the device fails authentication, then its MAC is learned on VLAN 100, provided that it exists and is not an authenticated VLAN. Otherwise, the device's MAC is learned on the default VLAN of the port if that VLAN is not an authenticated one. The device's MAC is blocked otherwise.

In the tagged case (not specifically shown), MAC authentication is performed first. If the device passed authentication and the VLAN is returned then the device is classified only if the VLAN exists and matches the tag VLAN. Otherwise the device is blocked. If the device fails authentication, then its MAC is learned on VLAN 100, provided that it exists, matches the tag VLAN, and is not an authenticated VLAN. The device's MAC is blocked otherwise.

Example 4

Command is 802.1x slot/port non-supplicant policy authentication pass vlan 10 block fail group-mobility default-vlan, which sets policies for non-supplicants. The policy treats tagged and non tagged frames differently.

Figure 18:
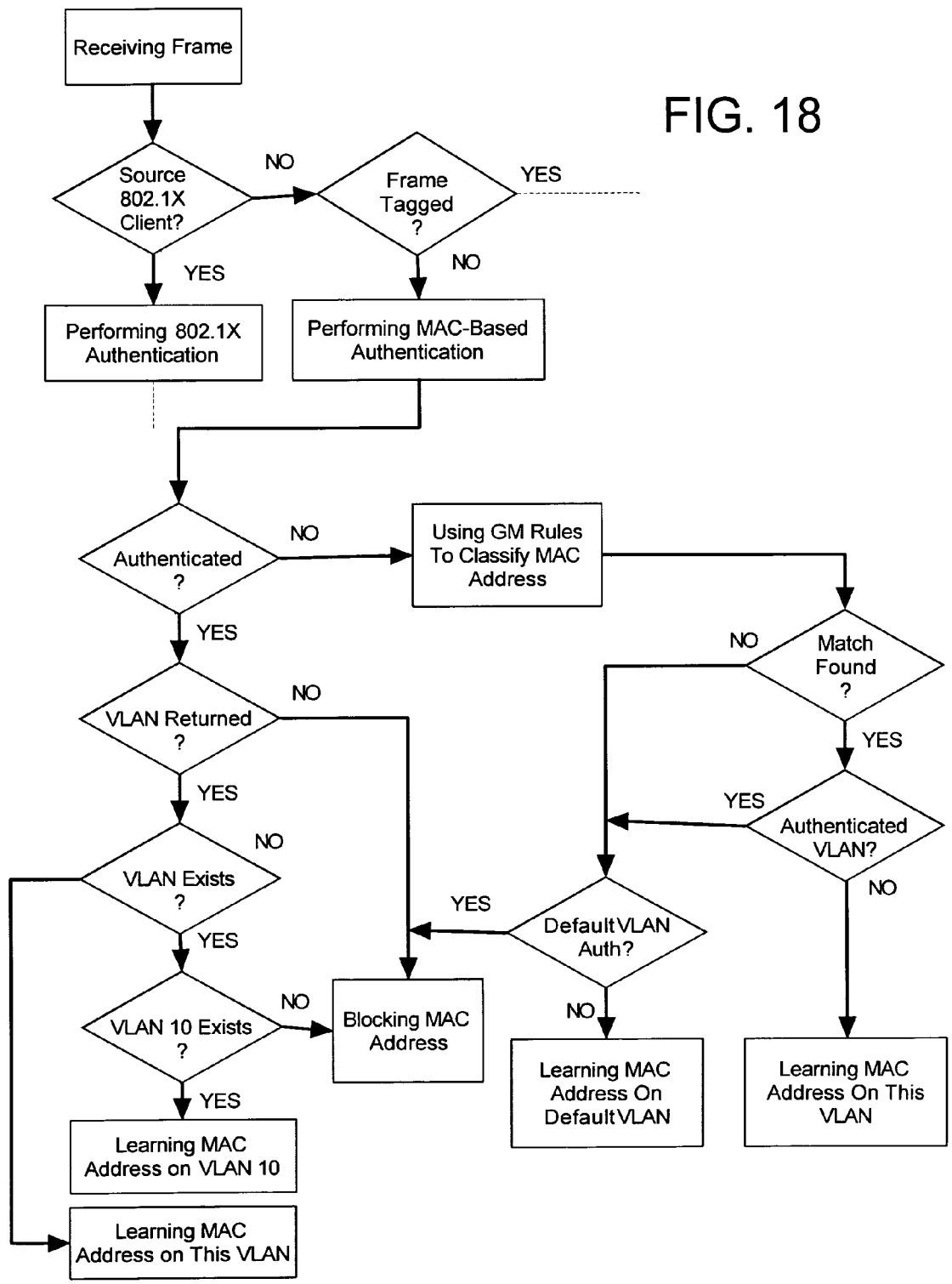
FIG. 18 shows a flow chart relating to a fourth example of a compound classification policy in accordance with the present invention.

In the non-tagged case, as shown in FIG. 18, MAC authentication is performed first. If the device passed authentication, but is not classified, then its MAC is learned on VLAN 10, provided that the VLAN exists. If the VLAN is not configured then the device's MAC is blocked. If the device fails authentication, VLAN classification rules are applied. If no rule matches, or the related VLAN is an authenticated one then the device's MAC is learned on the default VLAN provided that the latter VLAN is not an authenticated one. The device's MAC is blocked otherwise.

In the tagged case (not specifically shown), MAC authentication is performed first. If the device passed authentication and the VLAN is returned then the device is classified only if the VLAN exists and matches the tag VLAN. If the two do not match the device is blocked. If no VLAN is returned or the returned VLAN does not exist then the device is classified into VLAN 10 provided that the latter VLAN exists and matches the tag VLAN. Otherwise the device is blocked. If the device fails authentication it is classified into the tag VLAN if the latter not an authenticated VLAN and is mobile tag enabled. This is the case because the policy that comes after failed authentication is VLAN classification and having the tag VLAN mobile tag enabled is equivalent to having a matching rule. If the tag VLAN is not mobile tag enabled or is an authenticated VLAN the device's MAC is learned on the default VLAN provided that the latter VLAN matches the tag VLAN and is not an authenticated VLAN. The device's MAC is blocked otherwise.

Example 5

Command is 802.1x slot/port non-supplicant policy authentication pass vlan 10 block fail group-mobility vlan 43 default-vlan, which sets policies for non-supplicants. The policy treats tagged and non tagged frames differently.

Figure 19:
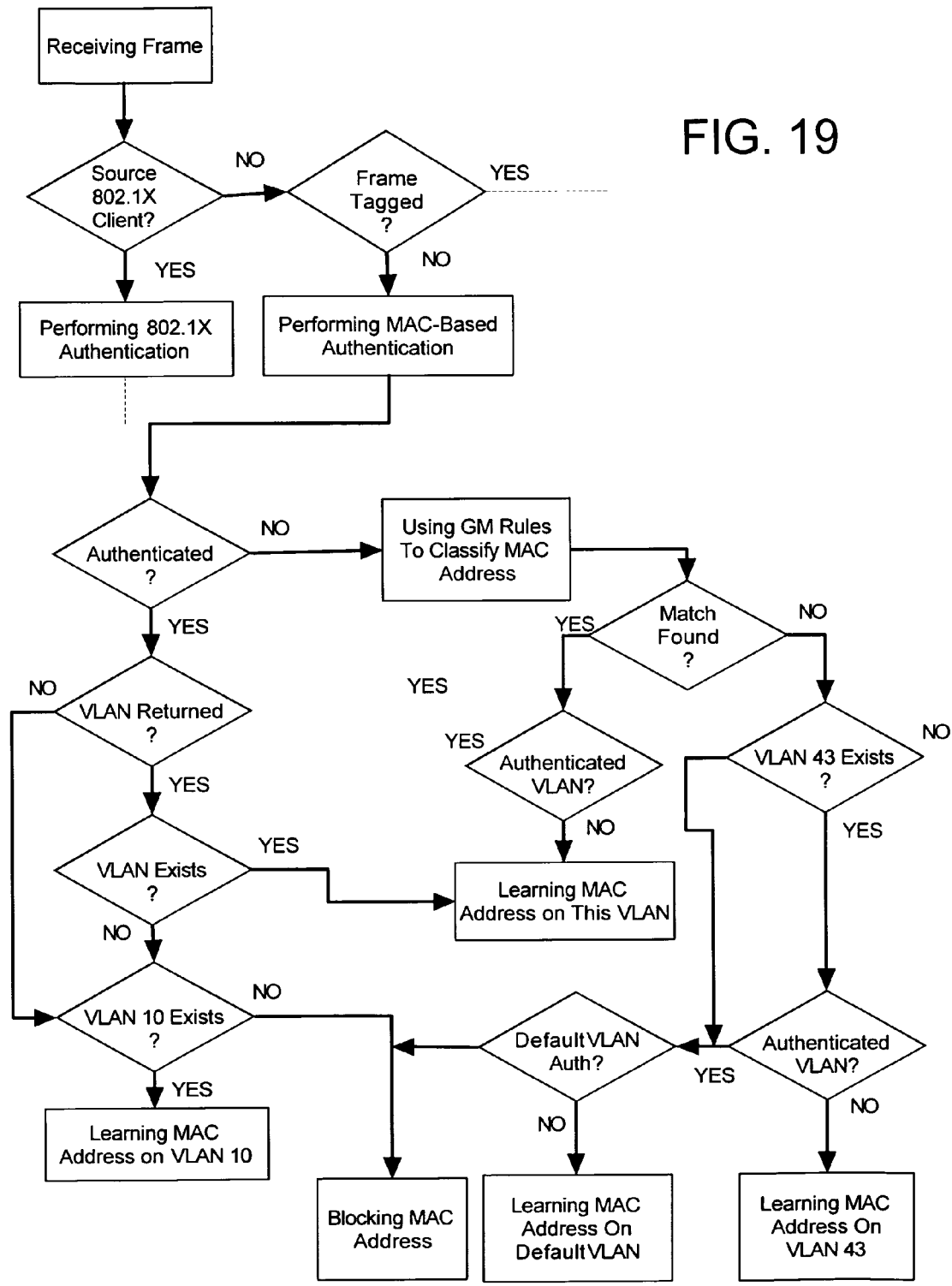
FIG. 19 shows a flow chart relating to a fifth example of a compound classification policy in accordance with the present invention.

In the non-tagged case, as shown in FIG. 19, MAC authentication is performed first. If the device passed authentication, but is not classified, then its MAC is learned on VLAN 10, provided that the VLAN exists. The device's MAC is blocked otherwise. If the device fails authentication, VLAN classification rules are applied. If no rule matches, or a rule matches, but the related VLAN is an authenticated one then the device's MAC is learned on VLAN 43—provided that the VLAN exists and is not an authenticated VLAN. If VLAN 43 does not exist or is an authenticated VLAN then the MAC is learned on the default VLAN provided that the default VLAN is not an authenticated VLAN. The device's MAC is blocked otherwise. This is shown on the flowchart in FIG. 12.

In the tagged case (not specifically shown), MAC authentication is performed first. If the device passed authentication and the VLAN is returned then the device is classified only if the VLAN exists and matches the tag VLAN. If the two do not match the device is blocked. If no VLAN is returned or the returned VLAN does not exist then the device is classified into VLAN 10 provided that the latter VLAN exists and matches the tag VLAN. Otherwise the device is blocked. If the device fails authentication it is classified into the tag VLAN if the latter not an authenticated VLAN and is mobile tag enabled. This is the case because the policy that comes after failed authentication is VLAN classification and having the tag VLAN mobile tag enabled is equivalent to having a matching rule. If the tag VLAN is not mobile tag enabled or is an authenticated VLAN the device's MAC is learned on VLAN 43 provided that the latter VLAN matches the tag VLAN and is not an authenticated VLAN. The device's MAC is blocked otherwise.

Example 6

Figure 20:
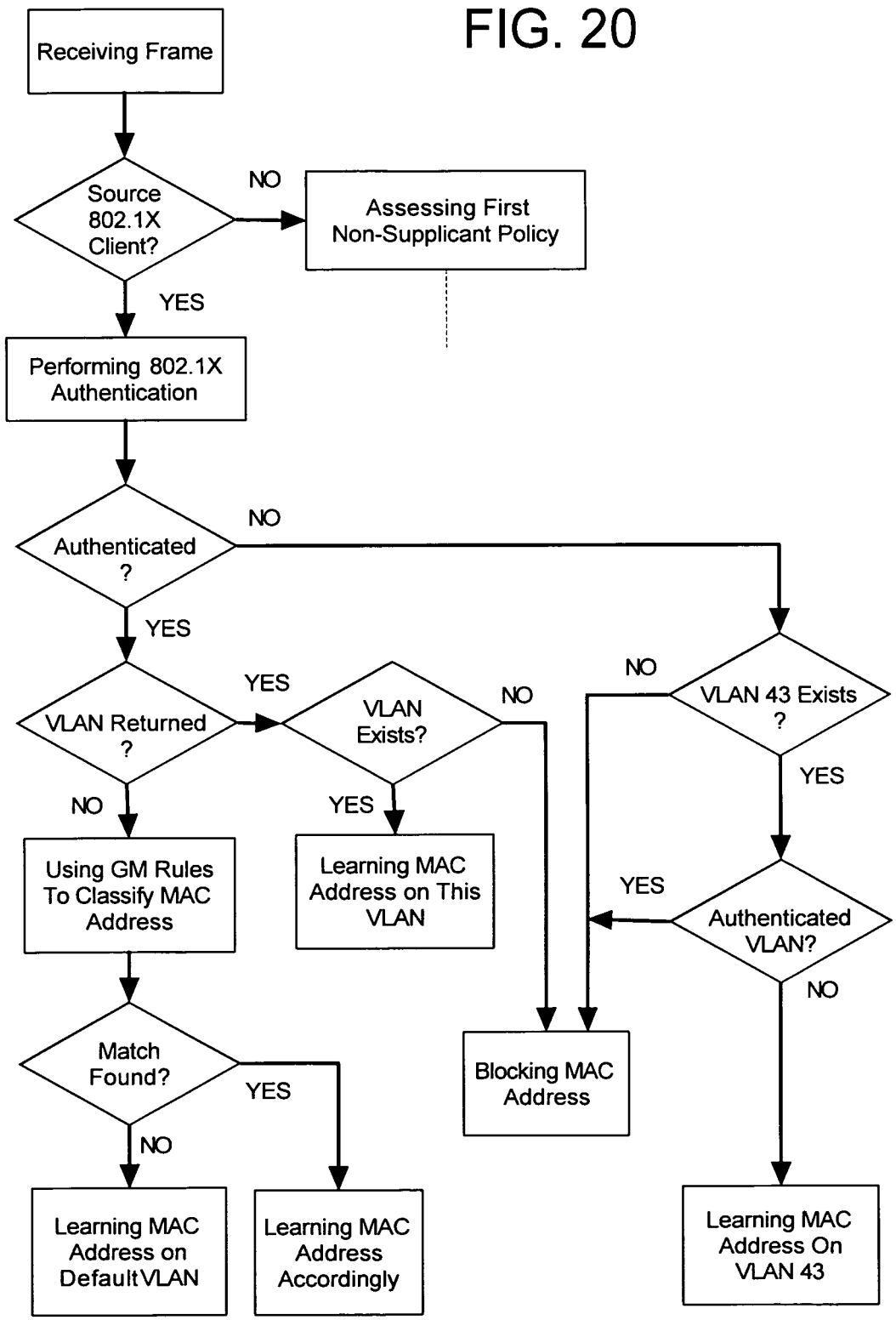
FIG. 20 shows a flow chart relating to a sixth example of a compound classification policy in accordance with the present invention.

Command is 802.1x slot/port supplicant policy authentication group-mobility default-vlan fail vlan 43 block, which sets policies for supplicants so that 802.1x authentication is performed first. However, this setting is mandatory, 802.1x authentication precedes any other policy. Referring to FIG. 20, if the device passed authentication, but is not classified, VLAN classification rules are applied. If no rule matches, then the device's MAC is learned on the default VLAN. If the device fails authentication then it is classified in VLAN 43 provided that the latter exists and is not an authenticated VLAN. The device is blocked otherwise. Note that VLAN 43 here plays the role of Failed VLAN for supplicants.

Example 7

Figure 21:
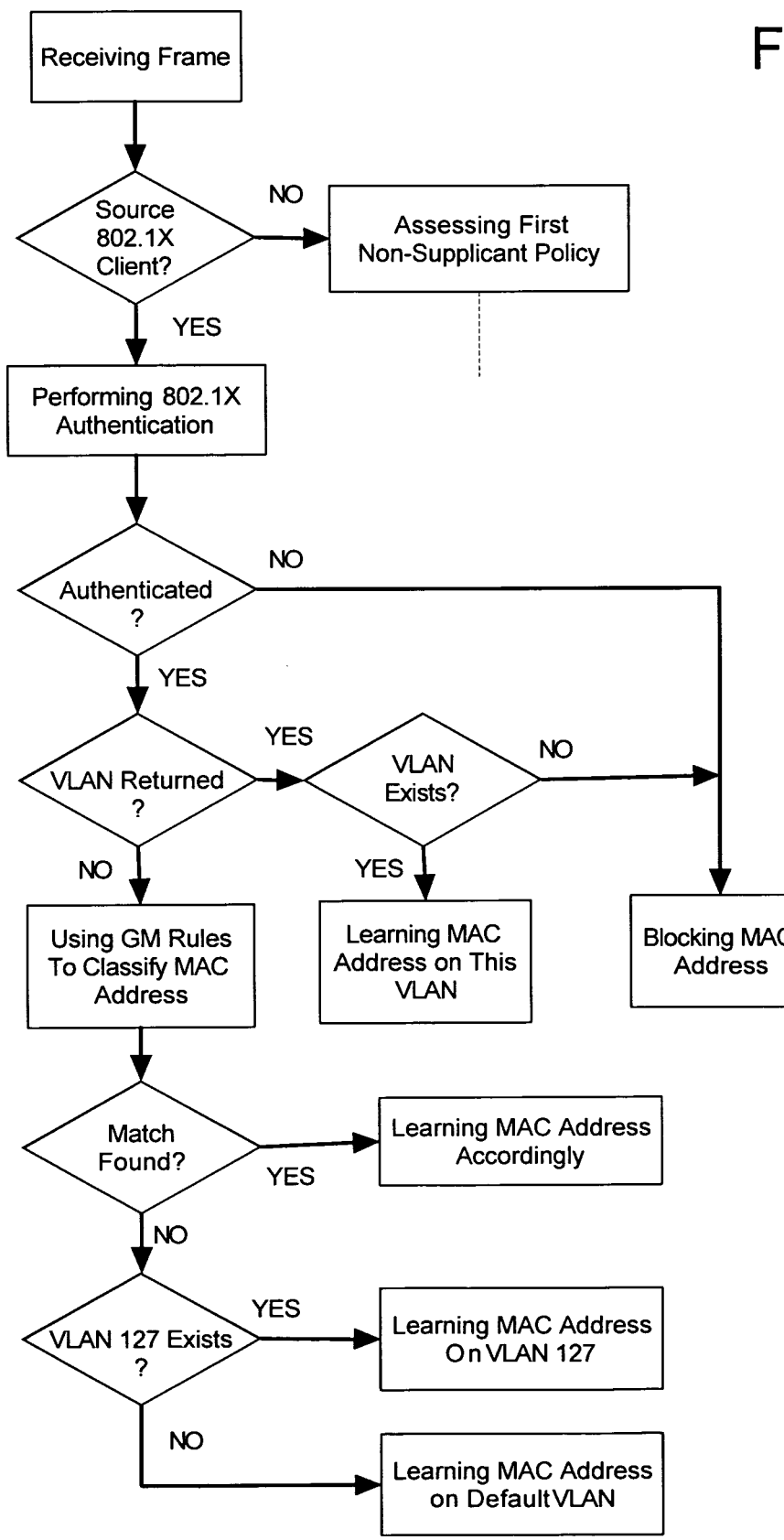
FIG. 21 shows a flow chart relating to a seventh example of a compound classification policy in accordance with the present invention.

Command is 802.1x slot/port supplicant policy authentication group-mobility vlan 127 default-vlan, which sets policies for supplicants so that 802.1x authentication is performed first. Referring to FIG. 21, if the device passed authentication, but is not classified, VLAN classification rules are applied. If no rule matches, then the device's MAC is learned on VLAN 127. If VLAN 127 does not exist then the MAC is learned on the default VLAN of the port. The device's MAC is blocked otherwise.

Referring now to instructions processible by a data processing device, it will be understood from the disclosures made herein that methods, processes and/or operations adapted for carrying out port assignment functionality as disclosed herein are tangibly embodied by computer readable medium having instructions thereon that are configured for carrying out such functionality. In one specific embodiment, the instructions are tangibly embodied for carrying out the method 100 as well as any one or more of the atomic policies and/or compound policy chains disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., instructions) adapted for carrying out port assignment functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method, comprising:
   maintaining a respective first classification policy structure and a respective second classification policy structure different than the first classification policy structure for each authentication mechanism supported by a network element;

facilitating authentication of a client device attempting to connect to a port of the network element using a particular authentication mechanism, wherein said facilitating includes determining whether the client device is configured for being authenticated using a first authentication mechanism and, in response to determining that the client device is not configured for being authenticated using the first authentication mechanism by the client device failing the first authentication mechanism, determining whether the client device is configured for being authenticated using at least one other authentication mechanism to arrive at the particular authentication mechanism;

providing the client device with network connectivity dependent upon the respective first classification policy structure of the particular authentication mechanism in response to the client device being successfully authenticated; and providing the client device with network connectivity dependent upon the respective second classification policy structure of the particular authentication mechanism in response to the client device failing to be successfully authenticated.

2. The method of claim 1 wherein:

providing the client device with network connectivity dependent upon the respective first classification policy structure includes assigning the client device to one of a first logical port interface and a first role dependent upon authentication attributes being received from a server performing said authentication and said authentication attributes including required information, and providing the client device with network connectivity dependent upon the respective second classification policy structure includes assigning the client device to one of a second logical port interface and a second role in response to at least one of said authentication attributes not being received from the server performing said authentication and said authentication attributes being determined to not including said required information after being received from the server performing said authentication.

3. The method of claim 1 wherein:

for each one of said authentication mechanisms, the respective first classification policy structure corresponding to the client device being successfully authenticated allows a different level of network accessibility than the respective second classification policy structure corresponding to the client device being unsuccessfully authenticated.

4. The method of claim 1 wherein:

in response to determining that the client device is configured for being authenticated using the particular authentication mechanism and facilitating a first instance of authentication of the client device via the particular authentication mechanism, facilitating a second instance of authentication of the client device.

5. The method of claim 1, further comprising:

assigning the client device to one of a logical port interface and a role each configured for allowing a first level of network accessibility in response to the client device being successfully authenticated using the particular authentication mechanism; and assigning the client device to one of a logical port interface and a role each configured for allowing a second level of network accessibility different than the first level in response to the client device failing to be successfully authenticated using the particular authentication mechanism.

6. The method of claim 5 wherein:

assigning the client device to one of the logical port interface and the role each configured for allowing a first level of network accessibility is performed dependent upon authentication attributes received from a server performing said authentication and in response to said authentication attributes including required information; and assigning the client device to one of the logical port interface and the role each configured for allowing a second level of network accessibility different than the first level is performed in response to at least one of said authentication attributes not being received from the server performing said authentication and said authentication attributes being determined to not including said required information after being received from the server performing said authentication.

7. The method of claim 1 wherein facilitating authentication of the client device includes:

in response to the client device not being configured for being authenticated using the first authentication mechanism, determining if the client device is configured for being authenticated using a second authentication mechanism; and in response to the client device not being configured for being authenticated using the first authentication mechanism or the second authentication mechanism, providing the client device with a level of network connectivity less than that corresponding to the client device being successfully authenticated using said first or second authentication mechanisms.

8. The method of claim 7 wherein:

providing the client device with network connectivity dependent upon the respective first classification policy structure includes assigning the client device to one of a first logical port interface and a first role dependent upon authentication attributes being received from a server performing said authentication and said authentication attributes including required information, and providing the client device with network connectivity dependent upon the respective second classification policy structure includes assigning the client device to one of a second logical port interface and a second role in response to at least one of said authentication attributes not being received from the server performing said authentication and said authentication attributes being determined to not including said required information after being received from the server performing said authentication.

9. The method of claim 8, further comprising:

assigning the client device to one of the logical port interface and the role each configured for allowing a first level of network accessibility is performed dependent upon authentication attributes received from a server performing said authentication and in response to said authentication attributes including required information; and assigning the client device to one of the logical port interface and the role each configured for allowing a second level of network accessibility different than the first level is performed in response to at least one of said authentication attributes not being received from the server performing said authentication and said authentication attributes being determined to not including said required information after being received from the server performing said authentication.

10. A set of processor-executable instructions stored on a computer readable medium, comprising:
   instructions for accessing a respective first classification policy structure and a respective second classification policy structure different than the first classification policy structure for each authentication mechanism supported by a network element;
   instructions for facilitating authentication of a client device attempting to connect to a port of the network element using a particular authentication mechanism, wherein said facilitating includes determining whether the client device is configured for being authenticated using a first authentication mechanism and, in response to determining that the client device is not configured for being authenticated using the first authentication mechanism by the client device failing the first authentication mechanism, determining whether the client device is configured for being authenticated using at least one other authentication mechanism to arrive at the particular authentication mechanism;
   instructions for providing the client device with network connectivity dependent upon the respective first classification policy structure of the particular authentication mechanism in response to the client device being successfully authenticated; and
   instructions for providing the client device with network connectivity dependent upon the respective second classification policy structure of the particular authentication mechanism in response to the client device failing to be successfully authenticated.

11. The set of processor-executable instructions of claim 10 wherein:
   providing the client device with network connectivity dependent upon the respective first classification policy structure includes assigning the client device to one of a first logical port interface and a first role dependent upon authentication attributes being received from a server performing said authentication and said authentication attributes including required information, and
   providing the client device with network connectivity dependent upon the respective second classification policy structure includes assigning the client device to one of a second logical port interface and a second role in response to at least one of said authentication attributes not being received from the server performing said authentication and said authentication attributes being determined to not including said required information after being received from the server performing said authentication.

12. The set of processor-executable instructions of claim 10 wherein:
   for each one of said authentication mechanisms, the respective first classification policy structure corresponding to the client device being successfully authenticated allows a different level of network accessibility than the respective second classification policy structure corresponding to the client device being unsuccessfully authenticated.

13. The set of processor-executable instructions of claim 10, further comprising:
   instructions for, in response to determining that the client device is configured for being authenticated using the particular authentication mechanism and facilitating a first instance of authentication of the client device via the particular authentication mechanism, facilitating a second instance of authentication of the client device.

14. The set of processor-executable instructions of claim 10, further comprising:
   instructions for assigning the client device to one of a logical port interface and a role each configured for allowing a first level of network accessibility in response to the client device being successfully authenticated using the particular authentication mechanism; and
   instructions for assigning the client device to one of a logical port interface and a role each configured for allowing a second level of network accessibility different than the first level in response to the client device failing to be successfully authenticated using the particular authentication mechanism.

15. The set of processor-executable instructions of claim 14 wherein:
   instructions for assigning the client device to one of the logical port interface and the role each configured for allowing a first level of network accessibility is performed dependent upon authentication attributes received from a server performing said authentication and in response to said authentication attributes including required information; and
   instructions for assigning the client device to one of the logical port interface and the role each configured for allowing a second level of network accessibility different than the first level is performed in response to at least one of said authentication attributes not being received from the server performing said authentication and said authentication attributes being determined to not including said required information after being received from the server performing said authentication.

16. The set of processor-executable instructions of claim 10 wherein facilitating authentication of the client device includes:
   in response to the client device not being configured for being authenticated using the first authentication mechanism, determining if the client device is configured for being authenticated using a second authentication mechanism; and
   in response to the client device not being configured for being authenticated using the first authentication mechanism or the second authentication mechanism, providing the client device with a level of network connectivity different than that corresponding to the client device being successfully authenticated using said first or second authentication mechanisms.

17. The set of processor-executable instructions of claim 16 wherein:
   providing the client device with network connectivity dependent upon the respective first classification policy structure includes assigning the client device to one of a first logical port interface and a first role dependent upon authentication attributes being received from a server performing said authentication and said authentication attributes including required information, and
   providing the client device with network connectivity dependent upon the respective second classification policy structure includes assigning the client device to one of a second logical port interface and a second role in response to at least one of said authentication attributes not being received from the server performing said authentication and said authentication attributes being determined to not including said required information after being received from the server performing said authentication.

18. The set of processor-executable instructions of claim 17, further comprising:
- instructions for assigning the client device to one of the logical port interface and the role each configured for allowing a first level of network accessibility is performed dependent upon authentication attributes received from a server performing said authentication and in response to said authentication attributes including required information; and
- instructions for assigning the client device to one of the logical port interface and the role each configured for allowing a second level of network accessibility different than the first level is performed in response to at least one of said authentication attributes not being received from the server performing said authentication and said authentication attributes being determined to not including said required information after being received from the server performing said authentication.

19. A server configured for:
- maintaining a respective first classification policy structure and a respective second classification policy structure different than the first classification policy structure for each authentication mechanism supported by a network element;
- facilitating authentication of a client device attempting to connect to a port of the network element using a particular authentication mechanism, wherein said facilitating includes determining whether the client device is configured for being authenticated using a first authentication mechanism and, in response to determining that the client device is not configured for being authenticated using the first authentication mechanism by the client device failing the first authentication mechanism, determining whether the client device is configured for being authenticated using at least one other authentication mechanism to arrive at the particular authentication mechanism;
- providing the client device with network connectivity dependent upon the respective first classification policy structure of the particular authentication mechanism in response to the client device being successfully authenticated; and
- providing the client device with network connectivity dependent upon the respective second classification policy structure of the particular authentication mechanism in response to the client device failing to be successfully authenticated.

20. The server of claim 19 wherein:
- providing the client device with network connectivity dependent upon the respective first classification policy structure includes assigning the client device to one of a first logical port interface and a first role dependent upon authentication attributes being received from a server performing said authentication and said authentication attributes including required information, and
- providing the client device with network connectivity dependent upon the respective second classification policy structure includes assigning the client device to one of a second logical port interface and a second role in response to at least one of said authentication attributes not being received from the server performing said authentication and said authentication attributes being determined to not including said required information after being received from the server performing said authentication.

21. The server of claim 19 wherein:
- for each one of said authentication mechanisms, the respective first classification policy structure corresponding to the client device being successfully authenticated allows a different level of network accessibility than the respective second classification policy structure corresponding to the client device being unsuccessfully authenticated.

22. The server of claim 19 being further configured for:
- in response to determining that the client device is configured for being authenticated using the particular authentication mechanism and facilitating a first instance of authentication of the client device via the particular authentication mechanism, facilitating a second instance of authentication of the client device.

23. The server of claim 19 being further configured for:
- assigning the client device to one of a logical port interface and a role each configured for allowing a first level of network accessibility in response to the client device being successfully authenticated using the particular authentication mechanism; and
- assigning the client device to one of a logical port interface and a role each configured for allowing a second level of network accessibility different than the first level in response to the client device failing to be successfully authenticated using the particular authentication mechanism.

24. The server of claim 23 wherein:
- assigning the client device to one of the logical port interface and the role each configured for allowing a first level of network accessibility is performed dependent upon authentication attributes received from a server performing said authentication and in response to said authentication attributes including required information; and
- assigning the client device to one of the logical port interface and the role each configured for allowing a second level of network accessibility different than the first level is performed in response to at least one of said authentication attributes not being received from the server performing said authentication and said authentication attributes being determined to not including said required information after being received from the server performing said authentication.

25. The server of claim 19 wherein facilitating authentication of the client device includes:
- in response to the client device not being configured for being authenticated using the first authentication mechanism, determining if the client device is configured for being authenticated using a second authentication mechanism; and
- in response to the client device not being configured for being authenticated using the first authentication mechanism or the second authentication mechanism, providing the client device with a level of network connectivity less than that corresponding to the client device being successfully authenticated using said first or second authentication mechanisms.

26. The server of claim 25 wherein:
- providing the client device with network connectivity dependent upon the respective first classification policy structure includes assigning the client device to one of a first logical port interface and a first role dependent upon authentication attributes being received from a server performing said authentication and said authentication attributes including required information, and providing the client device with network connectivity dependent upon the respective second classification policy structure includes assigning the client device to one of a second logical port interface and a second role in response to at least one of said authentication attributes not being received from the server performing said authentication and said authentication attributes being determined to not including said required information after being received from the server performing said authentication.

27. The server of claim 26 being further configured for:

assigning the client device to one of the logical port interface and the role each configured for allowing a first level of network accessibility is performed dependent upon authentication attributes received from a server performing said authentication and in response to said authentication attributes including required information; and assigning the client device to one of the logical port interface and the role each configured for allowing a second level of network accessibility different than the first level is performed in response to at least one of said authentication attributes not being received from the server performing said authentication and said authentication attributes being determined to not including said required information after being received from the server performing said authentication.

\* \* \* \* \*